(12) United States Patent
Rapaka et al.

(10) Patent No.: US 9,930,341 B2
(45) Date of Patent: Mar. 27, 2018

(54) BLOCK VECTOR CODING FOR INTRA BLOCK COPYING

(71) Applicant: QUALCOMM Incorporated, San Diego, CA (US)

(72) Inventors: Krishnakanth Rapaka, San Diego, CA (US); Marta Karczewicz, San Diego, CA (US); Chao Pang, San Diego, CA (US); Joel Sole Rojals, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 14/743,474

(22) Filed: Jun. 18, 2015

(65) Prior Publication Data

US 2015/0373334 A1 Dec. 24, 2015

Related U.S. Application Data

(60) Provisional application No. 62/015,269, filed on Jun. 20, 2014.

(51) Int. Cl.
*H04N 7/12* (2006.01)
*H04N 19/139* (2014.01)
(Continued)

(52) U.S. Cl.
CPC ........... *H04N 19/139* (2014.11); *H04N 19/13* (2014.11); *H04N 19/176* (2014.11); *H04N 19/52* (2014.11);
(Continued)

(58) Field of Classification Search
CPC .............................. H04N 19/139; H04N 19/70
See application file for complete search history.

(56) References Cited

PUBLICATIONS

Chen J., et al., "Description of screen content coding technology proposal by Qualcomn", 17. JCT-VC Meeting; Valencia, (Joint Collaborative Team on Video Coding of ISO/IEC JTC1/SC29/WG11 and ITU-T 3G.16), No. JCTVC-Q0031-v3, Mar. 28, 2014 (Mar. 28, 2014), XP030115916, pp. 1-19.

(Continued)

*Primary Examiner* — Young Lee
(74) *Attorney, Agent, or Firm* — Shumaker & Sieffert, P.A.

(57) ABSTRACT

An example method for decoding video data includes receiving syntax elements (SEs) for a component of a block vector that represents a displacement between a current block of video data and a predictor block of video data; decoding the SEs to determine a value of the component by at least: decoding a first SE to determine whether or not an absolute value of the component ($AbsVal_{comp}$) is greater than zero; where $AbsVal_{comp}$ is greater than zero, decoding a second SE to determine whether $AbsVal_{comp}$ is greater than a threshold based on an order of a set of codes; where $AbsVal_{comp}$ is greater than the threshold, decoding, using the set of codes, a third SE to determine $AbsVal_{comp}$ minus an offset based on the order of the set of codes; and where $AbsVal_{comp}$ is greater than zero, decoding a fourth SE to determine a sign of the value of the component.

24 Claims, 8 Drawing Sheets

(51) Int. Cl.
*H04N 19/513* (2014.01)
*H04N 19/13* (2014.01)
*H04N 19/176* (2014.01)
*H04N 19/70* (2014.01)
*H04N 19/52* (2014.01)
*H04N 19/593* (2014.01)

(52) U.S. Cl.
CPC ......... *H04N 19/521* (2014.11); *H04N 19/593* (2014.11); *H04N 19/70* (2014.11)

(56) References Cited

PUBLICATIONS

Flynn D., et al., "HEVC Range Extensions Draft 6", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P1005-v4, Apr. 3, 2014 (Apr. 3, 2014), 356 Pages, XP030115878.
International Search Report and Written Opinion from International Application No. PCT/US2015/036733, dated Sep. 14, 2015, 14 pp.
Pang C., et al., "Non-RCE3: Intra Motion Compensation with 2-D MV's", 14. JCT-VC Meeting; Jul. 25, 2013-Aug. 2, 2013; Vienna; (Joint Collaborative Team on Video Coding OFISO/IEC JTC1/SC29/WG11 and ITU-T SG.16), No. JCTVC-N0256, Aug. 2, 2013 (Aug. 2, 2013), pp. 1-8, XP002734362, Retrieved from the Internet: URL: http://wftp3.itu.int/av-arch/jctvc-site/.
Pang C., et al., "Non-RCE3: Intra Motion Compensation with 2-D MVs", 14. JCT-VC Meeting; Jul. 25, 2013-Aug. 2, 2013; Vienna; (Joint Collaborative Team on Video Coding of ISO/IEC JTC1/SC29/WG11 and ITU-TSG . 16) ; URL : http://wftp3.itu.int/av-arch/jctvc-site/,, No. JCTVC-N0256-v4, Aug. 2, 2013 (Aug. 2, 2013), pp. 1-12, XP030114777, p. 1-p. 2.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, Jctvc-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
Karczewicz et al., "Non-SCCE1: Block vector coding for Infra block copy," 18th Meeting; Sapporo, JP, Jun. 30 through Jul. 9, 2014, JCTVC-R0181, 5 pp.
Joshi et al., "Screen content coding test model 1 (SCM 1)," 17th Meeting; Valencia, ES, Mar. 27 through Apr. 4, 2014, JCTVC-Q1014, 5 pp.
Flynn et al., "High Efficiency Video Coding (HEVC) Range Extensions text specification: Draft 7", Joint Collaborative team on Video Coding of (JCT-VC) of ITU-T SG 16 WP3 and ISO/IEC JCT1/SC29/WG11, 17th Meeting, Valencia, ES Mar. 27 through Apr. 4, 2014, 376 pp.
Wang et al., "High Efficiency Video Coding (HEVC) Deferect Report 4", Joint Collaborative Team on Video Coding (JCT-VC) of ITU-T SG 16 WP 3 and ISO/IEC JTC 1/SC 29/WG 11, JCTVC-Q1003 (v.1), 17th Meeting: Valencia, ES, Mar. 27 through Apr. 4, 2014, 314 pp.
Wang et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, JCTVC-N1003, 14th Meeting, Vienna, AT, Jul. 25-Aug. 3, 2013, 311 pp.
Yu et al., "Requirements for an extension of HEVC for coding of screen content," ISO/IEC JTC 1/SC 29/WG 11 Requirements subgroup, San Jose, California, USA, document MPEG2013/N14174, Jan. 2014. 5 pp.
Karzewicz et al., "Non-SCCE1: Block vector coding for Intra block copy", 18th Meeting, Sapporo, JP, Jun. 30-Jul. 9 2014; (Joint Collaborative Team on Video Coding (JCT-VC) of ITU-T SG 16 WP 3 and ISO/IEC JTC 1/SC 29/WG 11), JCTVC-R0181_v3, Jul. 1, 2014, 8 pp.
Yu et al., "Common conditions for screen content coding tests", 17th Meeting, Valencia, ES, Mar. 27-Apr. 4, 2014; (Joint Collaborative Team on Video Coding (JCT-VC) of ITU-T SG 16 WP 3 and ISO/IEC JTC 1/SC 29/WG 11), JCTVC-Q1015, May 7, 2014, 5 pp.
Bardone D., et al., "Adaptive Golomb Codes for Level Binarization in the H.264/AVC FRExt Lossless Mode," Signal Processing and Information Technology, 2008. ISSPIT 2008. IEEE International Symposium on IEEE, Piscataway, NJ, USA, Dec. 16, 2008, XP031419586, ISBN: 978-1-4244-3554-8, 5 pp.
Response to Written Opinion dated Sep. 14, 2015, from international application No. PCT/US0215/036733, filed Apr. 14, 2016, 7 pp.
Second Written Opinion of International Application No. PCT/US0215/036733, dated Jun. 17, 2016, 16 pp.
Response to Second Written Opinion dated Jun. 17, 2016, from International Application No. PCT/US0215/036733, dated Aug. 15, 2016, 7 pp.
International Preliminary Report on Patentability from International Application No. PCT/US0215/036733, dated Sep. 30, 2016, 9 pp.

BLOCK VECTOR CODING FOR INTRA BLOCK COPYING

This application claims the benefit of U.S. Provisional Application No. 62/015,269, filed Jun. 20, 2014, the entire content of which is incorporated by reference herein in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques for performing Intra-prediction for video coding. More particularly, this disclosure describes techniques for facilitating Intra Block Copying (Intra BC). Intra BC refers to Intra-prediction techniques in which a current video block is coded based on a prediction block within the same picture. The prediction block within the same picture is identified by a vector, which may be referred to as a block vector. In some examples, a block vector that identifies a prediction block may be represented by a plurality of syntax elements, which may be encoded and decoded. In some examples, as opposed coding a block vector using the same syntax elements used to code motion vectors, a block vector may be coded using different syntax elements.

In one example, a method for decoding video data includes receiving, in an encoded video bitstream and for a current block of video data, a residual block and a set of syntax elements for a component of a block vector that represents a displacement between the current block and a predictor block of video data in a picture in which the current block resides. In this example, the method also includes decoding the set of syntax elements to determine a value of the component of the block vector by at least: decoding a first syntax element of the set of syntax elements to determine whether or not an absolute value of the component of the block vector is greater than zero; based on the absolute value of the component of the block vector being greater than zero, decoding a second syntax element of the set of syntax elements to determine whether or not the absolute value of the component of the block vector is greater than a threshold that is based on an order of a set of codes; based on the absolute value of the component of the block vector being greater than the threshold, decoding, using the set of codes, a third syntax element to determine the absolute value of the component of the block vector minus an offset that is based on the order of the set of codes; and based on the absolute value of the component of the block vector being greater than zero, decoding a fourth syntax element of the set of syntax elements to determine whether the value of the component of the block vector is positive or negative; determining, based on the value of the component of the block vector, the predictor block of video data; and reconstructing the current block of video data based on the predictor block of video data and the residual block.

In another example, a device for decoding video data includes means for receiving, in an encoded video bitstream and for a current block of video data, a residual block and a set of syntax elements for a component of a block vector that represents a displacement between the current block and a predictor block of video data in a picture in which the current block resides; means for decoding the set of syntax elements to determine a value of the component of the block vector, wherein the means for decoding the set of syntax elements include: means for decoding a first syntax element of the set of syntax elements to determine whether or not an absolute value of the component of the block vector is greater than zero; means for, based on the absolute value of the component of the block vector being greater than zero, decoding a second syntax element of the set of syntax elements to determine whether or not the absolute value of the component of the block vector is greater than a threshold that is based on an order of a set of codes; means for, based on the absolute value of the component of the block vector being greater than the threshold, decoding, using the set of codes, a third syntax element to determine the absolute value of the component of the block vector minus an offset that is based on the order of the set of codes; and means for, based on the absolute value of the component of the block vector being greater than zero, decoding a fourth syntax element of the set of syntax elements to determine whether the value of the component of the block vector is positive or negative. In this example, the device also includes means for determining, based on the value of the component of the block vector, the predictor block of video data; and means for reconstructing the current block of video data based on the predictor block of video data and the residual block.

In another example, a method for encoding video data includes selecting a predictor block for a current block of video data from a plurality of previously encoded blocks of video data in a picture in which the current block of video data resides; and encoding, in an encoded video bitstream and for the current block of video data, a residual block and a set of syntax elements that represent a value of a component of a block vector that represents a displacement between the current block of video data and the predictor block by at least: encoding a first syntax element of the set of syntax elements that indicates whether or not an absolute value of the component of the block vector is greater than zero; based on the absolute value of the component of the block vector being greater than zero, encoding a second syntax element of the set of syntax elements that indicates whether or not the absolute value of the component of the block vector is greater than a threshold that is based on an order of a set of codes; based on the absolute value of the component of the block vector being greater than the threshold, encoding, using the set of codes, a third syntax element of the set of syntax elements that indicates the absolute value of the component of the block vector minus an offset that is based on the order of the set of codes; and based on the absolute value of the component of the block vector being greater than zero, encoding a fourth syntax element of the set of syntax elements that indicates whether the value of the component of the block vector is positive or negative.

In another example, a device for encoding video data includes means for selecting a predictor block for a current block of video data from a plurality of previously encoded blocks of video data in a picture in which the current block of video data resides; means for encoding, in an encoded video bitstream and for the current block of video data, a residual block and a set of syntax elements that represent a value of a component of a block vector that represents a displacement between the current block of video data and the predictor block, wherein the means for encoding the residual block and the set of syntax elements include: means for encoding a first syntax element of the set of syntax elements that indicates whether or not an absolute value of the component of the block vector is greater than zero; means for, based on the absolute value of the component of the block vector being greater than zero, encoding a second syntax element of the set of syntax elements that indicates whether or not the absolute value of the component of the block vector is greater than a threshold that is based on an order of a set of codes; means for, based on the absolute value of the component of the block vector being greater than the threshold, encoding, using the set of codes, a third syntax element of the set of syntax elements that indicates the absolute value of the component of the block vector minus an offset that is based on the order of the set of codes; and means for, based on the absolute value of the component of the block vector being greater than zero, encoding a fourth syntax element of the set of syntax elements that indicates whether the value of the component of the block vector is positive or negative.

In another example, a device for encoding or decoding video data includes a memory configured to store data associated with a current block of video data; and one or more processors. In this example, the one or more processors are configured to: determine a block vector for a current block of video data as part of intra block copying, wherein a component of the block vector represents a displacement between the current block of video data and a predictor block of video data in a picture in which the current block resides; determine a value of the component of the block vector by at least the processors being configured to: determine a first syntax element that indicates whether or not an absolute value of the component of the block vector is greater than zero; in response to the absolute value of the component of the block vector being greater than zero, determine a second syntax element that indicates whether or not the absolute value of the component of the block vector is greater than a threshold that is based on an order of a set of codes; in response to the absolute value of the component of the block vector being greater than the threshold: determine a third syntax element of the set of syntax elements that indicates the absolute value of the component of the block vector minus an offset that is based on the order of the set of codes; and determine to encode or decode the third syntax element using the set of codes; and in response to the absolute value of the component of the block vector being greater than zero, determine a fourth syntax element that indicates whether the value of the component of the block vector is positive or negative; and reconstruct the current block of video data based on the predictor block of video data and the residual block.

In another example, a computer-readable storage medium stores instruction that, when executed, cause one or more processors of a device to encode or decode a current block of video data by at least: determining a block vector for a current block of video data as part of intra block copying, wherein a component of the block vector represents a displacement between the current block of video data and a predictor block of video data in a picture in which the current block resides; determining a value of the component of the block vector, wherein the instructions that cause the one or more processors to determine the value of the component of the block vectors comprise instructions that cause the one or more processors of the device to: determine a first syntax element that indicates whether or not an absolute value of the component of the block vector is greater than zero; in response to the absolute value of the component of the block vector being greater than zero, determine a second syntax element that indicates whether or not the absolute value of the component of the block vector is greater than a threshold that is based on an order of a set of codes; in response to the absolute value of the component of the block vector being greater than the threshold: determine a third syntax element of the set of syntax elements that indicates the absolute value of the component of the block vector minus an offset that is based on the order of the set of codes; and determine to encode or decode the third syntax element using the set of codes; and in response to the absolute value of the component of the block vector being greater than zero, determine a fourth syntax element that indicates whether the value of the component of the block vector is positive or negative; and reconstructing the current block of video data based on the predictor block of video data and the residual block The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
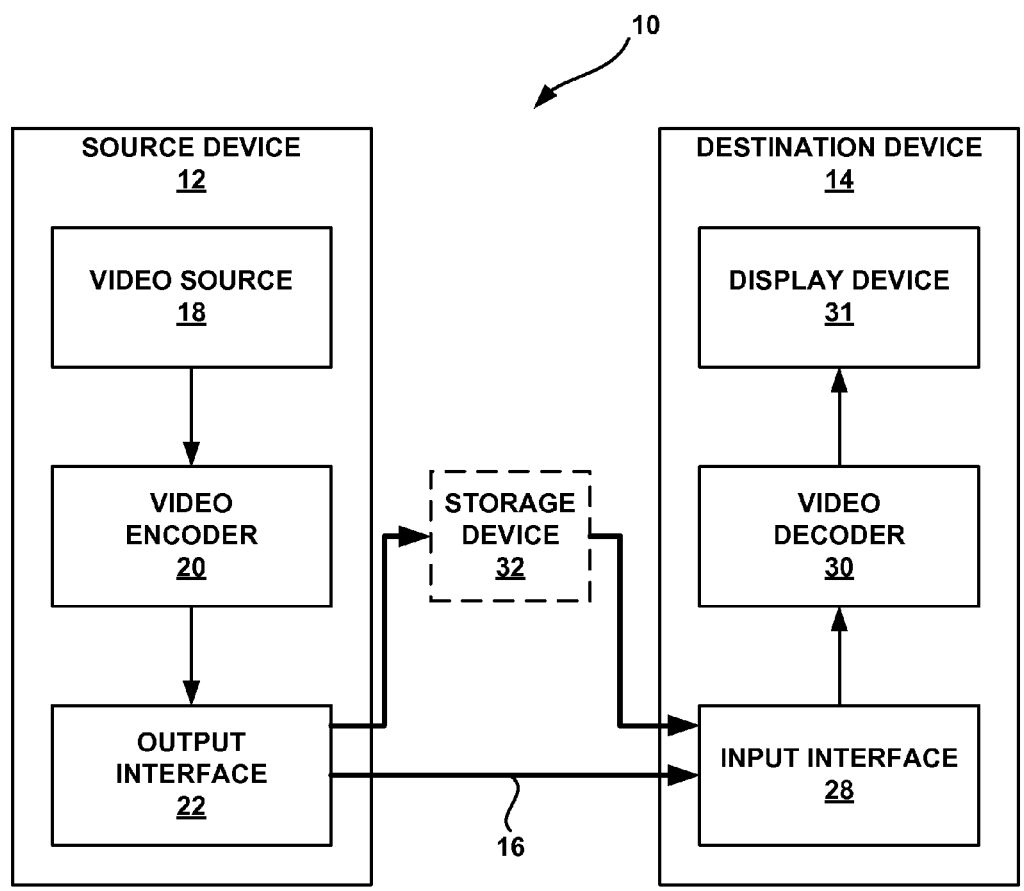
FIG. 1 is a block diagram illustrating an example video encoding and decoding system that may utilize the techniques described in this disclosure.

A video sequence is generally represented as a sequence of pictures. Typically, block-based coding techniques are used to code each of the individual pictures. That is, each picture is divided into blocks, and each of the blocks is individually coded. Coding a block of video data generally involves forming predicted values for pixels in the block and coding residual values. The predicted values are formed using pixel samples in one or more predictive blocks. The residual values represent the differences between the pixels of the original block and the predicted pixel values. Specifically, the original block of video data includes an array of pixel values, and the predicted block includes an array of predicted pixel values. The residual values represent pixel-by-pixel differences between the pixel values of the original block and the predicted pixel values.

Prediction techniques for a block of video data are generally categorized as intra-prediction and inter-prediction. Intra-prediction, or spatial prediction, generally involves predicting the block from pixel values of neighboring, previously coded blocks in the same picture. Inter-prediction, or temporal prediction, generally involves predicting the block from pixel values of one or more previously coded pictures.

Many applications, such as remote desktop, remote gaming, wireless displays, automotive infotainment, cloud computing, etc., are becoming routine in daily lives. Video contents in these applications are usually combinations of natural content, text, artificial graphics, etc. In text and artificial graphics region, repeated patterns (such as characters, icons, symbols, etc.) often exist. Intra Block Copying (BC) is a technique which may enable a video coder to remove such redundancy and improve intra-picture coding efficiency. In some instances, Intra BC alternatively may be referred to as Intra motion compensation (MC).

To predict a current block of video data using Intra BC techniques, a video coder may determine a block vector that identifies a predictive block of video data (i.e., a block of previously coded video data) that is within the same picture as the current block of video data. As one example, a video encoder may select the predictive block as a block of previously coded video data that is found to closely match the current block of video data, determine a value of a block vector that indicates a position of the predictive block relative to the current block, and encode a representation of the value of the block vector. As another example, a video decoder may receive an encoded representation of a value of a block vector that indicates a position of a predictive block relative to a current block, and decode the representation to determine the value of the block vector.

In some examples, the value of the component of the block vector represented by the syntax elements may be the actual value of the component. For instance, in examples where the value of a component of a block vector is negative seven, the actual value of that component may be negative seven. In some examples, the value of the component of the block vector represented by the syntax elements may be a differential value of the component that corresponds to a difference between a predictor of the component (e.g., a default value, a previous value of the component, a value of the component from a neighboring block) and the actual value of the component. The differential value may be referred to as the block vector difference (BVD). In some examples, a video encoder may determine the differential value of the component by subtracting the actual value of the component from the predictor of the component. Similarly, in some examples, a video decoder may determine the actual value of the component by adding the differential value of the component to the predictor of the component.

In some examples, as opposed to simply encoding a value of the block vector without compression, a video encoder may implement a compression scheme to encode the value of the block vector by generating a plurality of syntax elements that collectively represent the value of the block vector, and a video decoder may implement a complementary compression scheme to decode the plurality of syntax elements into the value of the block vector. In some examples, such as in a previous HEVC Range Extension standard draft, as described in Flynn et al., "High Efficiency Video Coding (HEVC) Range Extensions text specification: Draft 6," Document: JCTVC-P1005_v1, JCT-VC of ITU-T SG 16 WP 3 and ISO/IEC JTC 1/SC 29/WG 11, 16$^{th}$ Meeting: San José, US 9-17 Jan. 2014 (hereinafter "JCTVC-P1005"), the vector for Intra BC (e.g., block vector) may be encoded using the motion vector difference (MVD) coding method in HEVC.

In the MVD coding method in HEVC (as described in JCTVC-P1005), the MVD is coded using four syntax elements: abs_mvd_greater0_flag, abs_mvd_greater1_flag, abs_mvd_minus2, and mvd_sign_flag. The syntax element abs_mvd_greater0_flag indicates whether the absolute value of the MVD is greater than zero and is encoded using fixed length code with a length of one. The syntax element abs_mvd_greater1_flag indicates whether the absolute value of the MVD is greater than one and is encoded using a fixed length code with a length of one. The syntax element abs_mvd_minus2 indicates the absolute value of the MVD minus two and is encoded using first order exponential golomb codes. The syntax element mvd_sign_flag indicates whether the value of the MVD is positive or negative and is encoded using a fixed length code with a length of one.

However, due to the different characteristics of Intra BC block vector fields from conventional inter motion vector fields, this coding method may not be efficient. For example, the distribution of BVD values is observed to be almost flat and slowly decreasing as BVD value increases while the distribution of MVD values rapidly drops as MVD value increases. In some examples, the different distributions of BVD values and MVD values occur because BVs are determined using pattern matching whereas MVs are determined using temporal matching.

The MVD coding method in HEVC described above is well suited for MVD values because most MVD values are between zero and five. In particular, the first order exponential golomb codes are well suited to code the absolute value of the MVD minus two because lower ordered exponential golomb codes are better suited to encode smaller values. However, BVD values are typically not so clustered and values of BVDs are generally larger than values of MVDs. For instance, values of BVDs may range from zero to as big as the picture size (e.g., 500). As such, it may be desirable for a video encoder to implement a compression scheme that takes advantage of the distribution of BVD values.

In accordance with one or more techniques of this disclosure, a video coder may implement a compression scheme that takes advantage of the flat distribution of BVD. For instance, a video coder may implement a compression scheme that uses higher order codes, such as higher order exponential golomb codes, to represent the value of a BVD. For example, a video coder may code a value of a BVD by coding a syntax element that indicates whether or not an absolute value of the BVD is greater than zero. Where the absolute value of the BVD is greater than zero, the video coder may code a syntax element that indicates whether or not the absolute value of the BVD is greater than a threshold, which may be based on an order of a set of codes, such as a set of exponential golomb codes. As discussed below, in some examples, the set of codes may be used to encode a representation of the absolute value of the BVD. In some examples, the order of the set of codes may be relatively high, such as four, although other orders of codes may be used (e.g., 1, 2, 3, or 5). In some examples, the threshold may be the number 1 left shifted by the order of the codes (e.g., 1<<order). In some examples, the order of the codes may be pre-determined. In other examples, the video coder may code a syntax element that indicates the order.

Where the absolute value of the BVD is greater than the threshold, the video coder may code, using the set of codes, a syntax element that indicates the absolute value of the BVD minus an offset, which may be based on the order of the set of codes. In some examples, the offset may be the threshold minus one (e.g., offset=threshold−1). Where the absolute value of the BVD is not greater than the threshold, the video coder may code, using fixed length codes having a length equivalent to the order of the set of codes, a syntax element that indicates the absolute value of the BVD minus one. Additionally, where the absolute value of the BVD is greater than zero, the video coder may code a fourth syntax element that indicates whether the value of the BVD is positive or negative. In this way, a video coder may reduce the amount of data used to code a block vector.

In some examples, the block vector may have a plurality of components. For instance, the block vector may have a horizontal component (x) and a vertical component (y). As such, in some examples, the video encoder may encode the value of each respective component of the block vector by generating a respective plurality of syntax elements that collectively represent the value of the respective component of the block vector, and a video decoder may implement a complementary compression scheme to decode the plurality of syntax elements into the respective values of the components of the block vector FIG. 1 is a block diagram illustrating an example video encoding and decoding system 10 that may utilize techniques for filtering video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may store the encoded video generated by source device 12.

Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 31. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing Intra BC in video coding may be performed by any digital video encoding and/or decoding device. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 32) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the High Efficiency Video Coding (HEVC) or ITU-T H.265 standard, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). Version 1 of HEVC was finalized on Jan. 25, 2013 and the specification was formally ratified as a standard on Apr. 13, 2013 and is available from www.itu.int/rec/T-REC-H.265-201304-S/en. The latest HEVC draft specification is available from phenix.int-evry.fr/jct/doc_end_user/documents/15_Geneva/wg11/JCTVC-N1003-v1.zip.

While the techniques of this disclosure are not limited to any particular coding standard, the techniques may be relevant to the HEVC standard and particularly to HEVC range extensions such as screen content coding (SCC). The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block."

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in the HEVC standard has a purpose similar to that of a macroblock of the H.264 standard. However, a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that has three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence using the data contained in the bitstream.

Many applications, such as remote desktop, remote gaming, wireless displays, automotive infotainment, cloud computing, or the like, are becoming routine in daily personal lives. Video content in these applications are typically combinations of natural content, text, artificial graphics, and the like. In text and artificial graphics, regions of the content may include repeated patterns (such as characters, icons, and symbols to provide a few examples). Intra block copying (BC) is a technique that enables removal of this kind of redundancy, thereby potentially improving the intra-picture coding efficiency, e.g., as described in Pang et al., "Non-RCE3: Intra Motion Compensation with 2-D MVs," Document: JCTVC-N0256, JCT-VC of ITU-T SG 16 WP 3 and ISO/IEC JTC 1/SC 29/WG 11, 14$^{th}$ Meeting: Vienna, AT 25 Jul.-2 Aug. 2013 (hereinafter "JCTVC-N0256").

Figure 2:
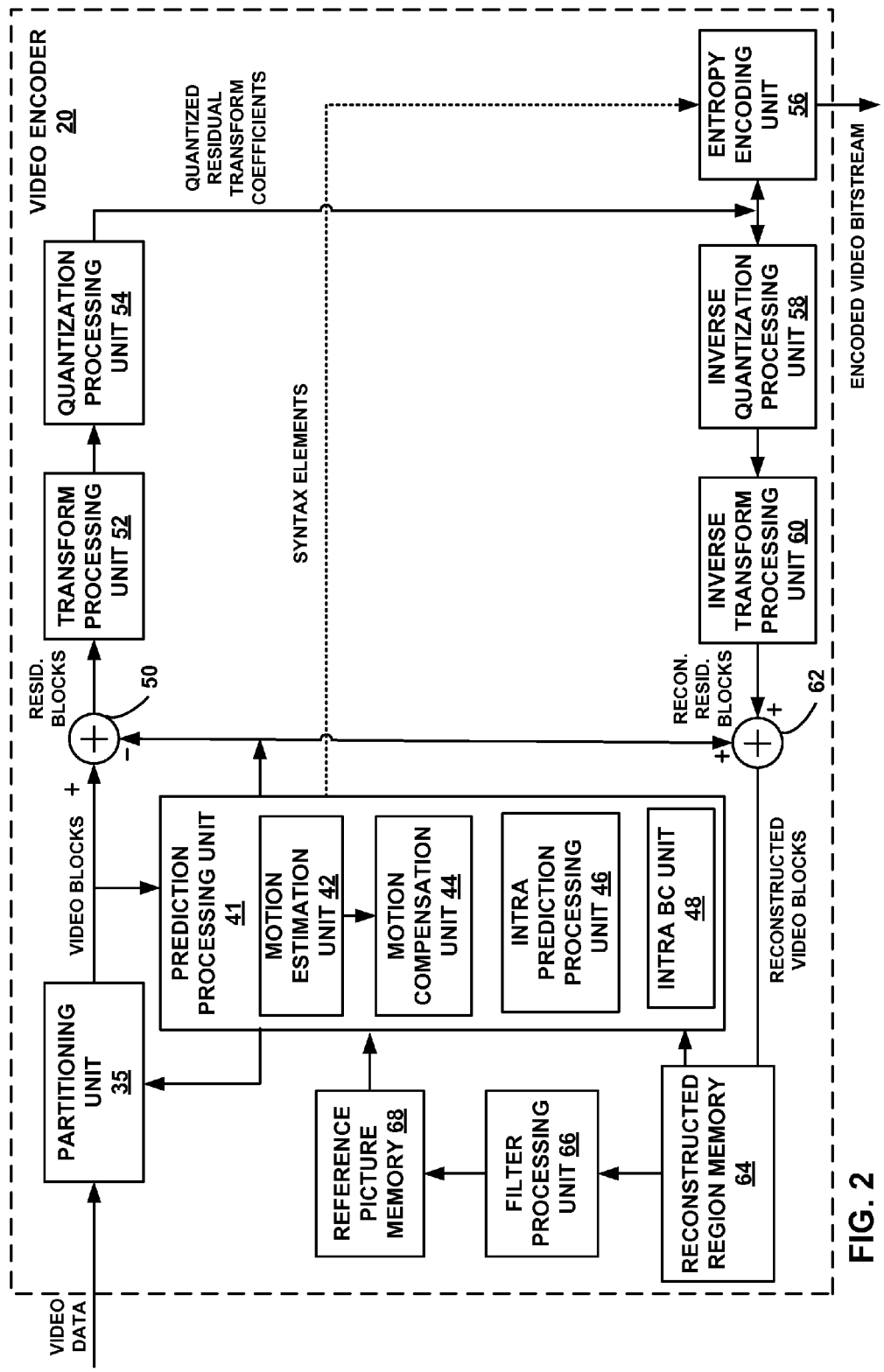
FIG. 2 is a block diagram illustrating an example video encoder that may implement the techniques described in this disclosure.

As illustrated in more detail in the example of FIG. 2, for a current coding unit (CU) (e.g., current video block 102 of FIG. 4) coded using Intra BC, video encoder 20 may obtain a prediction signal (e.g., predictor block 104 of FIG. 4) (which may also be referred to as a "prediction block") from a search region (e.g., reconstructed region 108 of FIG. 4) in the same picture. In some instances, video encoder 20 may encode a vector, e.g., block vector 106 of FIG. 4, which indicates the position of the prediction block displaced from the current CU. In some examples, the block vector may indicate the position of the top-left corner of the prediction block relative to the position of the top-left corner of the current CU. The block vector, in some instances, also may be referred to as an offset vector, displacement vector, or motion vector. Video encoder 20 also may encode residual data indicating differences between the pixel values of the current video block and the predictive samples in the predictive block.

As discussed above, in a previous HEVC Range Extension standard draft, as described in JCTVC-P1005, the vector for Intra BC (e.g., block vector 106 of FIG. 4) was encoded using the motion vector difference (MVD) coding method in HEVC. Specifically, as described in JCTVC-P1005, the vector for Intra BC was encoded using four syntax elements: abs_mvd_greater0_flag, abs_mvd_greater1_flag, abs_mvd_minus2, and mvd_sign_flag. The syntax element abs_mvd_greater0_flag indicates whether the absolute value of the MVD is greater than zero and is encoded using fixed length code with a length of one. The syntax element abs_mvd_greater1_flag indicates whether the absolute value of the MVD is greater than one and is encoded using fixed length code with a length of one. The syntax element abs_mvd_minus2 indicates the absolute value of the MVD minus two and is encoded using first order exponential golomb codes. The syntax element mvd_sign_flag indicates whether the value of the MVD is positive or negative and is encoded using fixed length code with a length of one.

However, due to the different characteristics of the Intra BC block vector field from a conventional inter motion vector field, this coding method may not be efficient. For example, the distribution of BVD values is observed to be almost flat and slowly decreasing as BVD value increases while the distribution of MVD values rapidly drops as MVD value increases. In some examples, the different distributions of BVD values and MVD values occur because BVs are determined using pattern matching whereas MVs are determined using temporal matching.

The MVD coding method in HEVC described above is well suited for MVD values because most MVD values are between zero and five. In particular, the first order exponential golomb codes are well suited to code the absolute value of the MVD minus two because lower ordered exponential golomb codes are better suited to encode smaller values. However, BVD values are typically not so clustered and values of BVDs are generally larger than values of MVDs. For instance, values of BVDs may range from zero to as big as the picture size (e.g., 500). As such, it may be desirable for video encoder 20 and video decoder 30 to implement a compression scheme that takes advantage of the distribution of BVD values.

In accordance with one or more aspects of the techniques described in this disclosure, as opposed to encoding a value of a block vector using the motion vector difference (MVD) coding method of HEVC, video encoder 20 may encode the value of a BVD using a different encoding method tailored to the characteristics of BVDs. For instance, video encoder 20 and video decoder 30 may implement a compression scheme that uses higher order codes, such as higher order exponential golomb codes, e.g., second, third, fourth, fifth or higher order, to represent the value of a BVD. For example, video encoder 20 may encode a value of a BVD by coding a syntax element that indicates whether or not an absolute value of the BVD is greater than zero.

Where the absolute value of the BVD is greater than zero, video encoder 20 may encode a syntax element that indicates whether or not the absolute value of the BVD is greater than a threshold, which may be based on an order of a set of codes, such as a set of exponential golomb codes. In some examples, the order of the set of codes may be relatively high, such as four, although other orders of codes may be used (e.g., 1, 2, 3, or 5). In some examples, the threshold may be one left shifted by the order of the codes (e.g., 1<<order).

Where the absolute value of the BVD is greater than the threshold, video encoder 20 may encode, using the set of codes, a syntax element that indicates the absolute value of the BVD minus an offset, which may be based on the order of the set of codes. In some examples, the offset may be the threshold minus one (e.g., offset=threshold−1). Where the absolute value of the BVD is not greater than the threshold, video encoder 20 may encode, using fixed length codes having a length equivalent to the order of the set of codes, a syntax element that indicates the absolute value of the BVD minus one. Additionally, where the absolute value of the BVD is greater than zero, video encoder 20 may encode a fourth syntax element that indicates whether the value of the BVD is positive or negative. In this way, video encoder 20 may reduce the amount of data used to code a BVD.

In some examples, the block vector (and, where applicable, therefore the BVD) may have a single component. For instance, video encoder 20 may be configured to use blocks of previously coded video data that are either directly above or directly in line horizontally with the current block of video data in the same picture for prediction of the current video block. In other words, if a picture of video data is imposed on a 2-D grid, each block of video data would occupy a unique range of x-values and y-values. Accordingly, video encoder 20 may predict a current block of video data based on blocks of previously coded video data that share only the same set of x-values (i.e., vertically in-line with the current video block) or the same set of y-values (i.e., horizontally in-line with the current video block).

In examples where video encoder 20 is configured to predict a current block of video data based on blocks of previously encoded video data that share only the same set of x-values, video encoder 20 may encode a block vector with a single component that identifies a prediction block of the blocks of previously encoded video data that share only the same set of x-values. Similarly, in examples where video encoder 20 is configured to predict a current block of video data based on blocks of previously coded video data that share only the same set of y-values, video encoder 20 may encode a block vector with a single component that identifies a prediction block of the blocks of previously encoded video data that share only the same set of y-values.

In some examples, the block vector may have multiple components. For instance, as described JCTVC-N0256, video encoder 20 may determine and encode a two-dimensional block vector which identifies a prediction block within the same picture as the current video block. In any case, the two-dimensional block vector may have a horizontal (x) displacement component (e.g., horizontal displacement component 112 of block vector 106 of FIG. 4) and a vertical (y) displacement component (e.g., vertical displacement component 110 of block vector 106 of FIG. 4), each of which may be zero or non-zero. The horizontal displacement component represents a horizontal displacement between the predictive block of video data, or prediction block, and a current block of video data and the vertical displacement component represents a vertical displacement between the prediction block of video data and the current block of video data.

In accordance with one or more techniques of this disclosure, video encoder 20 may encode a respective plurality of syntax elements that each collectively represent the respective value of each component of the block vector. That is, one set of syntax elements may represent the horizontal displacement component of the block vector, and another set of syntax elements may represent the vertical displacement component of the block vector. For each component of the block vector or the BVD, the set of syntax elements may include a first syntax element that indicates whether or not an absolute value of the respective component of the block vector is greater than zero, (where the absolute value of the respective component is greater than zero) a second syntax element that indicates whether or not the absolute value of the respective component is greater than a threshold that is based on an order of a set of codes, (where the absolute value of the component is greater than the threshold) a third syntax element that indicates the absolute value of the respective component minus an offset that is based on the order of the set of codes, and (where the absolute value of the respective component is greater than zero) a fourth syntax element that indicates a sign of the value of the respective component.

In some examples, it may be desirable to encode a value of a component of a BVD based on a maximum length of the BVD. For instance, once the maximum length of the component is known, it may be more efficient to encode the value using a fixed length code with a length determined based on the maximum length.

In accordance with one or more techniques of this disclosure, in some examples, as opposed to encoding a value of a BVD using the four syntax elements described above, video encoder 20 may encode the value of a BVD using a fixed length code with a length determined based on the maximum length of the BVD. For example, video encoder 20 may determine the maximum length of the BVD based on one or more parameters. While video encoder 20 may already know the actual value of the BVD for the current block, video encoder 20 may still determine the maximum length using parameters available at the decoder, i.e., to avoid an encoder/decoder mismatch. Some example parameters which video encoder 20 may use to determine the maximum length include, but are not limited to, a position of the current block, a location of the block vector predictor, and a picture boundary.

Video encoder 20 may determine a length of the fixed length code based on the determined maximum length. In some examples, video encoder 20 may determine the length of the fixed length code in accordance with Equation (1), below, where Length is the length of the fixed length code, and maxBVDlength is the determined maximum length of the BVD. Video encoder 20 may encode the value of the component using a fixed length code having the determined length.

$$\text{Length} = \text{Ceil}(\log 2(\text{maxBVDlength})) \qquad \text{Equation (1)}$$

In some examples, video encoder 20 may use a combination of the techniques described above. In such examples, video encoder 20 may encode a syntax element that indicates whether the value of the BVD is encoded using the four syntax elements or a fixed length code with a length determined based on the maximum length of the BVD.

In some examples, such as where video encoder 20 encodes a block vector with a horizontal component and a vertical component (i.e., where video encoder 20 encodes a BVDx and a BVDy), video encoder 20 may encode one of the components based on the other. For instance, video encoder 20 may encode BVDx and encode BVDy based on BVDx (or vice versa). As one example, video encoder 20 may encode a value, a sign, or a particular bin value of BVDy based on a value, a sign, or a particular bin value of BVDx (or vice versa).

Video decoder 30 also may be configured to use techniques that are generally reciprocal to those described above with respect to video encoder 20. In this respect, video decoder 30 may be configured to perform an Intra BC process to decode a coded current block of a picture using a prediction block identified by a block vector.

In accordance with one or more aspects of the techniques described in this disclosure, as opposed to decoding a value of a block vector using the motion vector difference (MVD) coding method in HEVC, video decoder 30 may decode the value of a BVD using a decoding method tailored to the characteristics of BVDs. For example, to determine a value of a BVD, video decoder 30 may decode a first syntax element to determine whether or not an absolute value of the BVD is greater than zero. Where the absolute value of the BVD is greater than zero, video decoder 30 may decode a second syntax element to determine whether or not the absolute value of the BVD is greater than a threshold, which may be based on an order of a set of codes, such as a set of exponential golomb codes. In some examples, the order of the set of codes may be relatively high, such as four, although other orders of codes may be used (e.g., 1, 2, 3, or 5). In some examples, the threshold may be one left shifted by the order of the codes (e.g., 1<<order). Where the absolute value of the BVD is greater than the threshold, video decoder 30 may decode, using the set of codes, a third syntax element to determine the absolute value of the component of the block vector minus an offset, which may be based on the order of the set of codes. In some examples, the offset may be the threshold minus one (e.g., offset=threshold−1). Where the absolute value of the BVD is not greater than the threshold, video decoder 30 may decode, using fixed length codes having a length equivalent to the order of the set of codes, a third syntax element of the set of syntax elements to determine the absolute value of the component of the block vector minus one. Additionally, where the absolute value of the BVD is greater than zero, video decoder 30 may decode a fourth syntax element to determine whether the value of the BVD is positive or negative. In this way, video decoder 30 may decode the value of a block vector by using an encoding method tailored to the characteristics of BVDs.

Video decoder 30 may decode the current block using the predictor block identified by the block vector. For instance, video decoder 30 may generate the current block based on a residual block that represents pixel differences between the prediction block and the current block.

FIG. 2 is a block diagram illustrating an example video encoder that may implement the techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal or inter-view prediction to reduce or remove redundancy in video within adjacent frames or pictures of a video sequence. Intra-mode (I mode) may refer to any of several spatial based compression modes. Inter-modes, such as uni-directional prediction (P mode) or bi-prediction (B mode), may include to any of several temporal-based compression modes. Video encoder 20 may also be configured to utilize a mode for intra prediction of blocks of video data from predictive blocks of video data within the same picture, e.g., an Intra BC mode, as described herein.

In the example of FIG. 2, video encoder 20 includes a partitioning unit 35, prediction processing unit 41, reconstructed region memory 64, filter processing unit 66, reference picture memory 68, summer 50, transform processing unit 52, quantization processing unit 54, and entropy encoding unit 56. Prediction processing unit 41 includes motion estimation unit 42, motion compensation unit 44, intra-prediction processing unit 46, and Intra Block Copy (Intra BC) unit 48. For video block reconstruction, video encoder 20 also includes inverse quantization processing unit 58, inverse transform processing unit 60, and summer 62.

In various examples, a unit of video encoder 20 may be tasked to perform the techniques of this disclosure. Also, in some examples, the techniques of this disclosure may be divided among one or more of the units of video encoder 20. For example, Intra BC unit 48 may perform the techniques of this disclosure, alone, or in combination with other units of video encoder, such as motion estimation unit 42, motion compensation unit 44, intra-prediction processing unit 46, reconstructed region memory 64, and entropy encoding unit 56. In some examples, video encoder 20 may not include Intra BC unit 48 and the functionality of Intra BC unit 48 may be performed by other components of prediction processing unit 41, such as motion estimation unit 42 and/or motion compensation unit 44.

As shown in FIG. 2, video encoder 20 receives video data, and partitioning unit 35 partitions the data into video blocks. This partitioning may also include partitioning into slices, tiles, or other larger units, as well as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles).

Prediction processing unit 41 may select one of a plurality of possible coding modes, such as one of a plurality of intra coding modes, one of a plurality of inter coding modes, or an Intra BC mode according to the techniques described in this disclosure, for the current video block based on rate-distortion results (e.g., coding bit rate and the level of distortion). Prediction processing unit 41 may provide the resulting predictive block to summer 50 to generate residual block data and to summer 62 to reconstruct the current block for use in prediction of other video blocks, e.g., as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures, e.g., to provide temporal compression.

Motion estimation unit 42 may be configured to determine the inter-prediction mode for a video slice according to a predetermined pattern for a video sequence. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture. Similarly, the block vector used for Intra BC according to the techniques of this disclosure indicate the displacement of a PU of a video block within a current video frame or picture relative to a predictive block within the same frame or picture. Intra BC unit 48 may determine vectors, e.g., block vectors, for Intra BC coding in a manner similar to the determination of motion vectors by motion estimation unit 42 for inter prediction, or may utilize motion estimation unit 42 to determine the block vector.

A predictive block, e.g., identified by motion estimation unit 42 and/or Intra BC unit for inter prediction or Intra BC prediction, is a block that is found to closely match the PU of the video block to be coded in terms of pixel difference between the PU and the predictive block. The pixel different may be determined by sum of absolute difference (SAD), sum of squared difference (SSD), or other difference metrics. In some examples, video encoder 20 may calculate values for sub-integer pixel positions of reference pictures stored in reference picture memory 68 or the reconstructed region of the current picture stored in reconstructed region memory 64. For example, video encoder 20 may interpolate values of one-quarter pixel positions, one-eighth pixel positions, or other fractional pixel positions of the reference picture. Therefore, motion estimation unit 42 and/or Intra BC unit 48 may perform a search for a predictive block relative to the full pixel positions and fractional pixel positions and output a vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0 or RefPicList0) or a second reference picture list (List 1 or RefPicList1), each of which identify one or more reference pictures stored in reference picture memory 68. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists.

In some examples, Intra BC unit 48 may generate vectors and fetch predictive blocks in a manner similar to that described above with respect to motion estimation unit 42 and motion compensation unit 44, but with the predictive blocks being in the same picture or frame as the current block and with the vectors being referred to as block vectors as opposed to motion vectors. In other examples, Intra BC unit 48 may use motion estimation unit 42 and motion compensation unit 44, in whole or in part, to perform such functions for Intra BC prediction according to the techniques described herein. In either case, for Intra BC, a predictive block may be a block that is found to closely match the block to be coded, in terms of pixel difference, which may be determined by sum of absolute difference (SAD), sum of squared difference (SSD), or other difference metrics, and identification of the block may include calculation of values for sub-integer pixel positions.

Whether the predictive video block is from the same picture according to Intra BC prediction, or a different picture according to inter prediction, video encoder 20 may form a residual video block by subtracting pixel values of the predictive block from the pixel values of the current video block being coded, forming pixel difference values. The pixel difference values form residual data for the block, and may include both luma component differences and chroma component differences. Summer 50 represents the component or components that perform this subtraction operation. Intra BC unit 48 and/or motion compensation unit 44 may also generate syntax elements associated with the video blocks and the video slice for use by a video decoder, such as video decoder 30, in decoding the video blocks of the video slice. The syntax elements may include, for example, syntax elements defining the vector used to identify the predictive block, any flags indicating the prediction mode, or any other syntax described with respect to the techniques of this disclosure.

Intra-prediction processing unit 46 may intra-predict a current block, as an alternative to the inter-prediction performed by motion estimation unit 42 and motion compensation unit 44, or the Intra BC prediction performed by Intra BC unit 48, as described above. In particular, intra-prediction processing unit 46 may determine an intra-prediction mode to use to encode a current block. In some examples, intra-prediction processing unit 46 may encode a current video block using various intra-prediction modes, e.g., during separate encoding passes, and intra-prediction processing unit 46 (or prediction processing unit 41, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via inter-prediction, intra-prediction, or Intra BC prediction, video encoder 20 forms a residual video block by subtracting the predictive block from the current video block, e.g., via summer 50. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Entropy encoding unit 56 may perform any of the techniques described herein for binarization and encoding syntax elements, including vector components, flags, and other syntax elements, for the prediction according to the Intra BC mode. Following the entropy encoding by entropy encoding unit 56, the encoded video bitstream may be transmitted to video decoder 30, or archived for later transmission or retrieval by video decoder 30.

Inverse quantization processing unit 58 and inverse transform processing unit 60 apply inverse quantization and inverse transformation, respectively, to reconstruct the residual block in the pixel domain for later use as a reference block for prediction of other video blocks. Motion compensation unit 44 and/or Intra BC unit 48 may calculate a reference block by adding the residual block to a predictive block of one of the reference pictures within one of the reference picture lists. Motion compensation unit 44 and/or Intra BC unit 48 may also apply one or more interpolation filters to the reconstructed residual block to calculate sub-integer pixel values for use in motion estimation.

Summer 62 adds the reconstructed residual block to the motion compensated prediction block produced by motion compensation unit 44 and/or Intra BC unit 48 to produce a reconstructed video block. Reconstructed region memory 64 stores reconstructed video blocks according to the definition of the reconstructed region for Intra BC of a current video block by video encoder 20, e.g., Intra BC unit 48, as described herein. Reconstructed region memory 64 may store reconstructed video blocks that have not been in-loop filtered by filter processing unit 66. Summer 62 may provide the reconstructed video blocks to filter processing unit 66 in parallel with reconstructed region memory 64, or reconstructed region memory 64 may release the reconstructed video blocks to filter processing unit 66 when no longer needed for the reconstructed region for Intra BC. In either case, Intra BC unit 48 may search the reconstructed video blocks in reconstructed region memory 64 for a predictive video block within the same picture as the current video block to predict the current video block.

Filter processing unit 66 may perform in-loop filtering on the reconstructed video blocks. In-loop filtering may include deblock filtering to filter block boundaries to remove blockiness artifacts from reconstructed video. In-loop filtering may also include sample-adaptive offset (SAO) filtering to improve the reconstructed video. Reconstructed blocks, some of which may be in-loop filtered, may be stored in reference picture memory 68 as reference pictures. The reference pictures may include reconstructed blocks that may be used by motion estimation unit 42 and motion compensation unit 44 as a predictive block to inter-predict a block in a subsequent video frame or picture.

The block vector may be a two-dimensional block vector that includes a horizontal component and a vertical component or the block vector may be a one-dimensional block vector that includes a horizontal component or a vertical component. The horizontal component may represent a horizontal displacement between the predictive block of video data and the current block of video data. The vertical component may represent a vertical displacement between the predictive block of video data and the current block of video data. The predictive block of video data is within the same frame as the current block of video data. Intra BC unit 48 may output a value for one or both of the horizontal component and the vertical component to entropy encoding unit 56.

In accordance with one or more aspects of the techniques described in this disclosure, as opposed to encoding a value of a block vector using the motion vector difference (MVD) coding method in HEVC, entropy encoding unit 56 may encode the value of a block vector using an encoding method tailored to the characteristics of block vectors. For example, entropy encoding unit 56 may encode a set of syntax elements to represent a value of a component of a block vector (or BVD). The meanings of the syntax elements and encoding techniques used to encode the syntax elements may be tailored to the characteristics of block vectors. In this way, techniques of this disclosure may reduce the number of bits used to encode the value of a block vector, which may improve coding efficiency.

For instance, entropy encoding unit 56 may determine a first syntax element for the component of the block vector. In some examples, the first syntax element may indicate whether an absolute value of a block vector component is greater than zero. In such examples, the first syntax element may be a binary flag (i.e., a fixed length code with a length of one), such as a first bin value (i.e., "b0"), and may be referred to as intra_bc_abs_bvd_greater0_flag. Entropy encoding unit 56 may determine the absolute value of a block vector component. Entropy encoding unit 56 may analyze the absolute value of the component to determine if it is greater than zero (i.e., if the component is non-zero). Where the absolute value of the component is greater than zero, entropy encoding unit 56 may determine that the first syntax element is one. Where the absolute value of the component is not greater than zero, entropy encoding unit 56 may determine that the first syntax element is zero.

In some examples, entropy encoding unit 56 may encode the first syntax element using context-adaptive binary arithmetic coding (CABAC) with a context. In some of such examples entropy encoding unit 56 may encode both a first syntax element for the horizontal component and a first syntax element for the vertical component with separate contexts. In other of such examples, entropy encoding unit 56 may encode both the first syntax element for the horizontal component and the first syntax element for the vertical component with the same context.

In some examples, such as where the absolute value of the component of the block vector is zero (i.e., where the value of the component of the block vector is maintained in integer precision and the absolute value of the component of the block vector is not greater than zero), entropy encoding unit 56 may not encode further syntax elements to represent the value of the component of the block vector. In other words, where the absolute value of the component of the block vector is zero, entropy encoding unit 56 may encode the value of the component of the block vector using only the first syntax element and may omit the second, third, and fourth syntax elements discussed below.

Entropy encoding unit 56 may determine a second syntax element for the component of the block vector. In some examples, the second syntax element may indicate whether an absolute value of a block vector component is greater than a threshold, which may be based on an order of a set of codes. In some examples, the threshold may be one left shifted by the order of the codes (e.g., 1<<order). For instance, where the set of codes is a set of exponential golomb codes with order four, the threshold may be 16. In such examples, the second syntax element may be a binary flag (i.e., a fixed length code with a length of one), such as a second bin value (i.e., "b1"), and may be referred to as intra_bc_abs_bvd_greater16_flag. Entropy encoding unit 56 may analyze the absolute value of the component to determine if it is greater than the threshold. Where the absolute value of the component is greater than the threshold, entropy encoding unit 56 may determine that the second syntax element is one. Where the absolute value of the component is not greater than the threshold, entropy encoding unit 56 may determine that the second syntax element is zero.

In some examples, entropy encoding unit 56 may encode the second syntax element using context-adaptive binary arithmetic coding (CABAC) with a context. In some of such examples entropy encoding unit 56 may encode both a second syntax element for the horizontal component and a second syntax element for the vertical component with separate CABAC contexts. In other of such examples, entropy encoding unit 56 may encode both the second syntax element for the horizontal component and the second syntax element for the vertical component with the same context.

Entropy encoding unit 56 may determine a third syntax element for the component of the block vector. Depending on whether or not the absolute value of the component of the block vector is greater than the threshold (i.e., the threshold used to determine the second syntax element), entropy encoding unit 56 may encode the third syntax element using one of a plurality of techniques, such as fixed length codes, rice golomb codes, or exponential golomb codes. Entropy encoding unit 56 may encode the third syntax element in bypass mode.

As one example, where the absolute value of the component of the block vector is not greater than the threshold, entropy encoding unit 56 may encode the third syntax element to represent the absolute value of the component minus one using fixed length codes having a length equivalent to the order of the set of codes. For instance, where the absolute value of the component is 14 and the order of the set of codes is four, entropy encoding unit 56 may encode the absolute value of the component as 1110 (i.e., a binary representation of 14−1). In such examples, the third syntax element may be a sequence of bin values (i.e., "b2−bn−1"), and may be referred to as intra_bc_abs_bvd_minus1. In some examples, fixed length codes may provide the most coding efficiency because the maximum value of the absolute value of the component is known (i.e., the threshold described above).

As another example, where the absolute value of the component of the block vector is greater than the threshold, entropy encoding unit 56 may encode, using the set of codes, the third syntax element to represent the absolute value of the component minus an offset, which may be based on the order of the set of codes. In some examples, the offset may be the threshold minus one (e.g., offset=threshold−1). For instance, where the absolute value of the component is 30 and the set of codes is a set of exponential golomb codes of order four, the offset may be 17 and entropy encoding unit 56 may encode the difference between the absolute value of the component and the offset (i.e., 30−17=13) as the fourth order exponential golomb code for 13. In such examples, the third syntax element may be a sequence of bin values (i.e., "b2−bn−1"), and may be referred to as intra_bc_abs_bvd_minus1. In some examples, higher order (e.g., fourth order) exponential golomb codes may provide the most coding efficiency because the maximum value of the absolute value of the component is not known and has a relatively flat probability distribution.

In some examples, entropy encoding unit 56 may encode a fourth syntax element that indicates a sign of the component. In other words, the fourth syntax element may indicate whether the component is positive or negative. In such examples, the fourth syntax element may be a binary flag (i.e., a fixed length code with a length of one), such as a last or final bin value (i.e., "bn"), and may be referred to as intra_bc_abs_bvd_sign_flag.

In some examples, entropy encoding unit 56 may encode the fourth syntax element in bypass mode without any context. In some examples, entropy encoding unit 56 may encode the fourth syntax using CABAC with one or more contexts. In some of such examples, entropy encoding unit 56 may encode both the horizontal component and the vertical component, and the fourth syntax element for the horizontal component and the fourth syntax element for the vertical component may be encoded with separate contexts. In some of such examples, entropy encoding unit 56 may encode both the horizontal component and the vertical component, and the fourth syntax element for the horizontal component and the fourth syntax element for the vertical component may be encoded with corresponding contexts (e.g., the same contexts).

Figure 3:
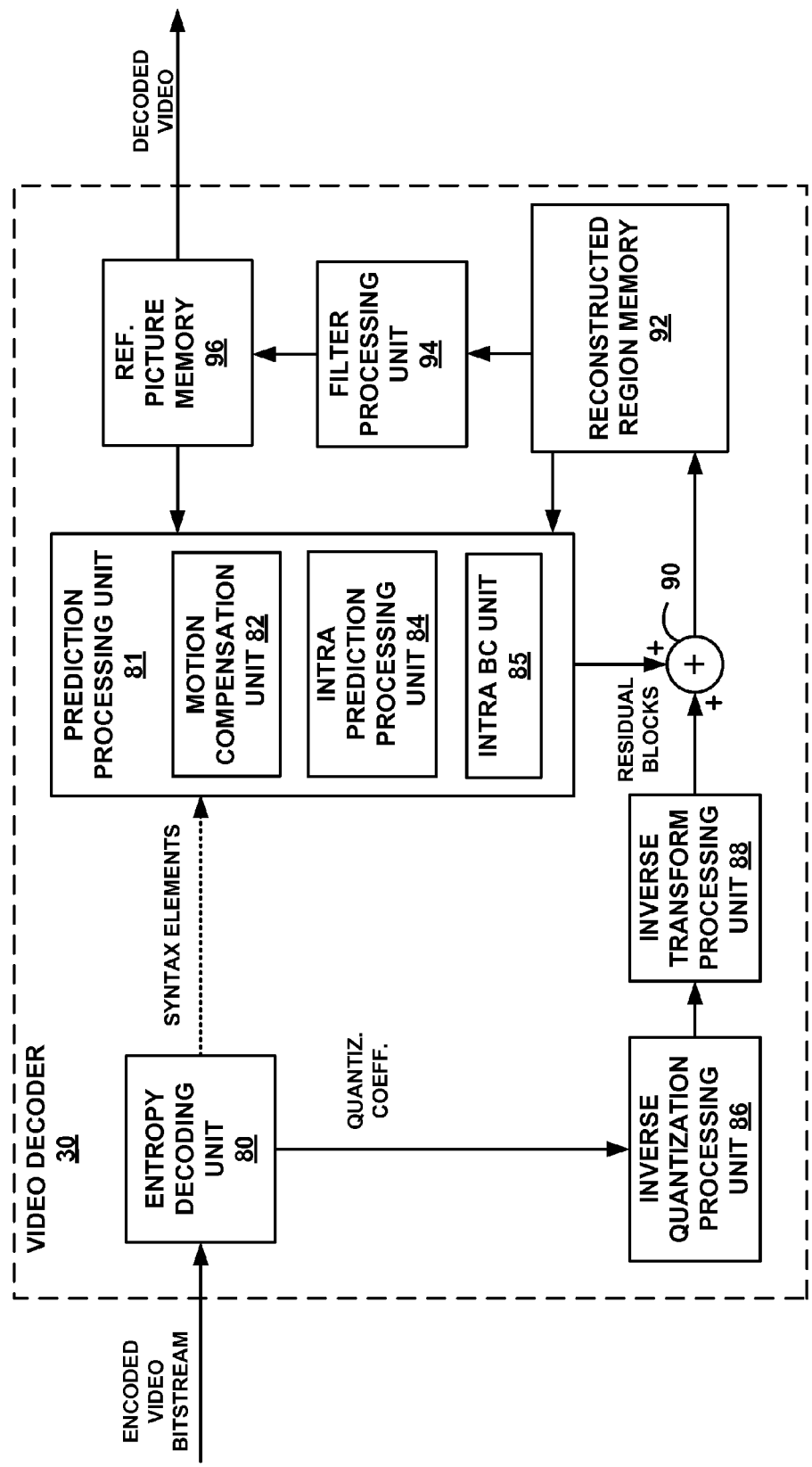
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes entropy decoding unit 80, prediction processing unit 81, inverse quantization processing unit 86, inverse transform processing unit 88, summer 90, reconstructed region memory 92, filter processing unit 94, and reference picture memory 96. Prediction processing unit 81 includes motion compensation unit 82, intra prediction processing unit 84, and an Intra Block Copy (Intra BC) unit 85. Video decoder 30 may, in some examples, perform a decoding pass generally reciprocal to the encoding pass described with respect to video encoder 20 from FIG. 2.

In various examples, a unit of video decoder 30 may be tasked to perform the techniques of this disclosure. Also, in some examples, the techniques of this disclosure may be divided among one or more of the units of video decoder 30. For example, Intra BC unit 85 may perform the techniques of this disclosure, alone, or in combination with other units of video decoder 30, such as motion compensation unit 82, intra prediction processing unit 84, reconstructed region memory 92, and entropy decoding unit 80. In some examples, video decoder 30 may not include Intra BC unit 85 and the functionality of Intra BC unit 85 may be performed by other components of prediction processing unit 81, such as motion compensation unit 82.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors for inter prediction, block vectors for Intra BC prediction, and other syntax elements described herein. Entropy decoding unit 80 may perform the inverse of any of the techniques described herein for binarization and encoding of syntax elements, including vector components, flags, and other syntax elements, for the prediction according to the Intra BC mode. Entropy decoding unit 80 forwards the vectors and other syntax elements to prediction processing unit 81. Video decoder 30 may receive the syntax elements at the sequence level, the picture level, the video slice level and/or the video block level.

As discussed above, a component of the encoded block vector may represent a displacement between a predictor block of video data and the current block of video data. The predictor block may be within the same picture as the current block. The block vector may be a two-dimensional block vector that includes a horizontal component and a vertical component or the block vector may be a one-dimensional block vector that includes a horizontal component or a vertical component. The horizontal component may represent a horizontal displacement between the predictor block of video data and the current block of video data. The vertical component may represent a vertical displacement between the predictor block of video data and the current block of video data. Entropy decoding unit 80 may decode one or both of the horizontal component and the vertical component.

In accordance with one or more aspects of the techniques described in this disclosure, as opposed to decoding a value of a block vector using the motion vector difference (MVD) coding method in HEVC, entropy decoding unit 80 may decode the value of a block vector using a decoding method tailored to the characteristics of block vectors for Intra BC mode. For example, entropy decoding unit 80 may utilize a process that is generally reciprocal to the encoding process used by entropy encoding unit 56 of encoder 20 to encode the block vector. For instance, entropy decoding unit 80 may decode the component of the block vector based on a set of syntax elements.

For instance, entropy decoding unit 80 may decode a first syntax element of the set of syntax elements to determine whether or not an absolute value of the component of the block vector is greater than zero. In such examples, the first syntax element may be a binary flag (i.e., a fixed length code with a length of one), such as a first bin value (i.e., "b0"), and may be referred to as intra_bc_abs_bvd_greater0_flag. In some examples, such as where the first syntax element is one, entropy decoding unit 80 may determine that the absolute value of the component is greater than zero. In some examples, such as where the first syntax element is zero, entropy decoding unit 80 may determine that the absolute value of the component is not greater than zero.

In some examples, entropy decoding unit 80 may decode the first syntax element using context-adaptive binary arithmetic coding (CABAC) with a context. In some of such examples, entropy decoding unit 80 may decode both a first syntax element for the horizontal component and a first syntax element for the vertical component with separate contexts. In other of such examples, entropy decoding unit 80 may decode both the first syntax element for the horizontal component and the first syntax element for the vertical component with the same context.

In some examples, such as where the absolute value of the component of the block vector is zero (i.e., where the value of the component of the block vector is maintained in integer precision and the first syntax element indicates that the absolute value of the component of the block vector is not greater than zero), entropy decoding unit 80 may not decode further syntax elements to represent the value of the component of the block vector. In other words, where the absolute value of the component of the block vector is zero, entropy decoding unit 80 may decode the value of the component of the block vector using only the first syntax element and may not receive/decode the second, third, and fourth syntax elements discussed below.

Entropy decoding unit 80 may decode a second syntax element for the component of the block vector to determine whether an absolute value of a block vector component is greater than a threshold, which may be based on an order of a set of codes. In some examples, the threshold may be one left shifted by the order of the codes (e.g., 1<<order). For instance, where the set of codes is a set of exponential golomb codes with order four, the threshold may be 16. In such examples, the second syntax element may be a binary flag (i.e., a fixed length code with a length of one), such as a second bin value (i.e., "b1"), and may be referred to as intra_bc_abs_bvd_greater16_flag. Where the second syntax element is one, entropy encoding unit 56 may determine that the absolute value of the component is greater than the threshold. Where the second syntax element is zero, entropy encoding unit 56 may determine that the absolute value of the component is not greater than the threshold.

In some examples, entropy decoding unit 80 may decode the second syntax element using context-adaptive binary arithmetic coding (CABAC) with a context. In some of such examples, entropy decoding unit 80 may decode both a second syntax element for the horizontal component and a second syntax element for the vertical component with separate contexts. In other of such examples, entropy decoding unit 80 may decode both the second syntax element for the horizontal component and the second syntax element for the vertical component with the same context.

Entropy decoding unit 80 may decode a third syntax element to determine the absolute value of the component of the block vector. In some examples, the third syntax element may be encoded using one of a plurality of techniques, such as fixed length codes, golomb-rice codes, or exponential golomb codes. In some of such examples, entropy decoding unit 80 may determine which technique was used to encode the third syntax element based on whether the absolute value of the component of the block vector is greater than the threshold. As discussed above, entropy decoding unit 80 may determine whether the absolute value of the component of the block vector being greater than the threshold based on the value of the second syntax element.

As one example, where the absolute value of the component of the block vector is not greater than the threshold (i.e., is less than or equal to the threshold), entropy decoding unit 80 may determine that the third syntax element is encoded using fixed length codes having a length equivalent to the order of the set of codes. In such examples, entropy decoding unit 80 may decode the third syntax element to determine the absolute value of the component of the block vector minus one. In some examples, the third syntax element may be a sequence of bin values (i.e., "b2–bn–1"), and may be referred to as intra_bc_abs_bvd_minus1. For instance, where third syntax element is 1110 and the order of the set of codes is four, entropy encoding unit 56 may determine that the absolute value of the component is 14 (i.e., 13+1).

As another example, where the absolute value of the component of the block vector is greater than the threshold, entropy decoding unit 80 may determine that the third syntax element is encoded using the set of codes. In such examples, entropy decoding unit 80 may decode the third syntax element to determine the absolute value of the component minus an offset, which may be based on the order of the set of codes. In some examples, the offset may be the threshold minus one (e.g., offset=threshold−1). In such examples, the third syntax element may be a sequence of bin values (i.e., "b2–bn–1"), and may be referred to as intra_bc_abs_bvd_minus1. For instance, where the third syntax element is the fourth order exponential golomb code for 13 and the set of codes is a set of exponential golomb codes of order four, the offset may be 17 and entropy decoding unit 80 may determine that the absolute value of the component is 30 (i.e., 13+17=30).

In some examples, entropy decoding unit 80 may decode a fourth syntax element to determine a sign of the component. In other words, the fourth syntax element may indicate whether the component is positive or negative. In such examples, the fourth syntax element may be a binary flag (i.e., a fixed length code with a length of one), such as a last or final bin value (i.e., "bn"), and may be referred to as intra_bc_abs_bvd_sign_flag.

In some examples, entropy decoding unit 80 may encode the fourth syntax element in bypass mode without any context. In some examples, entropy encoding unit 56 may decode the fourth syntax using CABAC with one or more contexts. In some of such examples, entropy decoding unit 80 may decode both the horizontal component and the vertical component, and the fourth syntax element for the horizontal component and the fourth syntax element for the vertical component may be decoded with separate contexts. In some of such examples, entropy decoding unit 80 may decode both the horizontal component and the vertical component, and the fourth syntax element for the horizontal component and the fourth syntax element for the vertical component may be decoded with corresponding contexts (e.g., the same contexts).

In any case, entropy decoding unit 80 may output the value of the component determined based on the syntax elements to Intra BC unit 85. In this way, entropy decoding unit 80 may decode an encoded block vector.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80.

The predictive blocks may be produced from one of the reference pictures within one of the reference picture lists. Video decoder 30 may construct the reference frame lists, RefPicList0 and RefPicList1, using default construction techniques or any other technique based on reference pictures stored in reference picture memory 96. When the video block is coded according to the Intra BC mode described herein, Intra BC unit 85 of prediction processing unit 81 produces predictive blocks for the current video block based on block vectors and other syntax elements received from entropy decoding unit 80. The predictive blocks may be within a reconstructed region within the same picture as the current video block defined by video encoder 20, and retrieved from reconstructed region memory 92.

Motion compensation unit 82 and Intra BC unit 85 determine prediction information for a video block of the current video slice by parsing the vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice. Similarly, Intra BC unit 85 may use some of the received syntax elements, e.g., a flag, to determine that the current video block was predicted using the Intra BC mode, construction information indicating which video blocks of the picture are within the reconstructed region and should be stored in reconstructed region memory 92, block vectors for each Intra BC predicted video block of the slice, Intra BC prediction status for each Intra BC predicted video block of the slice, and other information to decode the video blocks in the current video slice.

Motion compensation unit 82 and Intra BC unit 85 may also perform interpolation based on interpolation filters. Motion compensation unit 82 and Intra BC unit 85 may use interpolation filters as used by video encoder 20 during encoding of the video blocks to calculate interpolated values for sub-integer pixels of predictive blocks. In this case, motion compensation unit 82 and Intra BC unit 85 may determine the interpolation filters used by video encoder 20 from the received syntax elements and use the interpolation filters to produce predictive blocks.

Inverse quantization processing unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 or Intra BC unit 85 generates the predictive block for the current video block based on the vectors and other syntax elements, video decoder 30 forms a decoded video block by summing the residual blocks from inverse transform processing unit 88 with the corresponding predictive blocks generated by motion compensation unit 82 and Intra BC unit 85. Summer 90 represents the component or components that perform this summation operation to produce reconstructed video blocks.

Reconstructed region memory 92 stores reconstructed video blocks according to the definition of the reconstructed region for Intra BC of a current video block by video encoder 20, as described herein. Reconstructed region memory 92 may store reconstructed video blocks that have not been in-loop filtered by filter processing unit 94. Summer 90 may provide the reconstructed video blocks to filter processing unit 94 in parallel with reconstructed region memory 92, or reconstructed region memory 92 may release the reconstructed video blocks to filter processing unit 94 when no longer needed for the reconstructed region for Intra BC. In either case, Intra BC unit 85 retrieves a predictive video block for a current video block from reconstructed region memory 92.

Filter processing unit 94 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 96 as reference pictures. The reference pictures may include reconstructed blocks that may be used by motion compensation unit 82 as predictive blocks to inter-predict a block in a subsequent video frame or picture. Reference picture memory 96 also stores decoded video for later presentation on a display device, such as display device 31 of FIG. 1.

Figure 4:
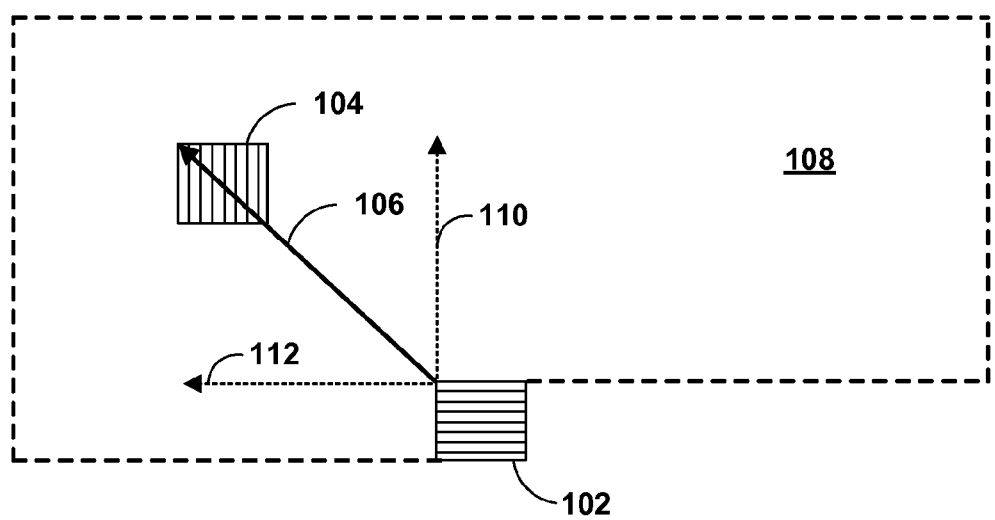
FIG. 4 is a conceptual diagram illustrating Intra block copying (BC) techniques.

FIG. 4 illustrates an example of an intra-prediction process including Intra BC in accordance with the techniques of the present disclosure. According to one example intra-prediction process, video encoder 20 may select a predictor video block, e.g., from a set of previously coded and reconstructed blocks of video data in the same picture as a current block to be coded. In the example of FIG. 4, reconstructed region 108 includes the set of previously coded and reconstructed video blocks. The blocks in the reconstructed region 108 may represent blocks that have been decoded and reconstructed by video decoder 30 and stored in reconstructed region memory 92, or blocks that have been decoded and reconstructed in the reconstruction loop of video encoder 20 and stored in reconstructed region memory 64. Current block 102 represents a current video block to be coded. Predictor block 104 represents a reconstructed video block, in the same picture as current block 102, which is used for Intra BC prediction of current block 102.

In the example intra-prediction process, video encoder 20 may determine and encode block vector 106, which indicates the position of predictor block 104 relative to current block 102, together with the residual signal. For instance, as illustrated by FIG. 4, block vector 106 may indicate the position of the upper-left corner of predictor block 104 relative to the upper-left corner of current block 102. Predictor block 104 may be a block that was found to most closely match the current block 102, e.g., based on a pixel difference between predictor block and the current block. Again, predictor block 104 may be formed with integer pixel precision from the reconstructed pixel data, or represent a fractional pixel precision block formed by interpolation. As discussed above, block vector 106 may also be referred to as an offset vector, displacement vector, or motion vector (MV). Video decoder 30 utilizes the encoded information for decoding the current CU.

In accordance with one or more techniques of this disclosure, the efficiency of block vector coding may be improved by implementing a coding scheme in view of the characteristics of Intra BC block vector fields. The techniques of this disclosure may be implemented separately or in combination. For example, video encoder 20 and video decoder 30 may implement each technique separately, or may implement one or more techniques in combination. For example, this disclosure proposes several techniques to more efficiently code block vectors (BVs).

The techniques are described with reference to horizontal displacement component 112 of block vector 106 (i.e., BV_x), although they may be equally applicable for vertical displacement component 110 of block vector 106 (i.e., BV_y). The techniques may be used on both the component of a one-dimensional block vector and one or both of the components of a two-dimensional block vector (i.e., horizontal component and vertical component). Additionally, the techniques refer to the binarization string for BV_x as including b0, b1, . . . , bn, where bi is the ith bin in the string.

In some examples, the value of the component of the block vector represented by the syntax elements may be the actual value of the component. For instance, in examples where the value of a component of a block vector is negative seven, the actual value of that component may be negative seven. In some examples, the value of the component of the block vector represented by the syntax elements may be a differential value of the component that corresponds to a difference between a predictor of the component (e.g., a default value, a previous value of the component, a value of the component from a neighboring block) and the actual value of the component. The differential value may be referred to as the block vector difference (BVD). In some examples, video encoder 20 may determine the differential value of the component by subtracting the actual value of the component from the predictor of the component. Similarly, in some examples, video decoder 30 may determine the actual value of the component by adding the differential value of the component to the predictor of the component.

These techniques for coding BVD values may be implemented by an entropy encoding unit of encoder 20, or by an entropy decoding unit of decoder 30. In other examples, these techniques may be implemented by a prediction processing unit of encoder 20, or by a prediction processing unit of decoder 30. In some examples, these techniques may be implemented by any combination of units of video encoder 20 and video decoder 30. For instance, in examples where video encoder 20 and video decoder 30 are implemented as an integrated circuit (IC) or a micro-controller, the techniques may be implemented by one or more units of the IC or micro-controller, which may be hard-wired logic.

A video coder, such as video encoder 20 or video decoder 30, may code a BVD using higher order Exponential Golombs (EG) with a grouping of regular bins (e.g., bins coded using CABAC) and non-regular bins (e.g., bins coded in bypass mode). Below example techniques are explained with reference to a horizontal BVD component; however the techniques may be similarly applicable to vertical components.

In this example, the horizontal component of the block vector is denoted as BVx, and the binarization string for BVx is denoted as $b_0 \, b_1 \ldots b_n$, where $b_i$ is the $i^{th}$ bin in the string.

In some examples, the first bin $b_0$ may indicate whether or not the absolute value of the horizontal component of the block vector is greater than zero (i.e., whether or not abs(BVx)>0). For instance, if the absolute value of the horizontal component of the block vector is greater than zero, the value of the first bin $b_0$ may be one (i.e., if abs(BVx)>0, $b_0$=1). Similarly, if the absolute value of the horizontal component of the block vector is not greater than zero, the value of the first bin $b_0$ may be zero (i.e., if abs(BVx)≤0, $b_0$=0). In some examples, the first bin $b_0$ may be encoded using CABAC with a context. In some examples, the first bin $b_0$ for the horizontal component and the first bin $b_0$ for the vertical component may have separate contexts. In some examples, the first bin $b_0$ for the horizontal component and the first bin $b_0$ for the vertical component may share the same contexts.

In some examples, the second bin $b_1$ may indicate if the absolute value of the horizontal component is greater than a threshold based on order of a set of codes. In some examples, the threshold may be the number one (1) left shifted by the order of the codes (e.g., 1<<order). For instance, if the absolute value is not greater than the threshold, the value of the second bin $b_1$ may be zero (i.e., if abs(BVx)≤(1<<order), $b_0$=0). Similarly, if the absolute value is greater than the threshold, the value of the second bin $b_1$ may be one (i.e., if abs(BVx)>(1<<order), $b_0$=1). In some examples, the second bin $b_1$ may be encoded using CABAC with a context. In some examples, the second bin $b_1$ for the horizontal component and the second bin $b_1$ for the vertical component may have separate contexts. In some examples, the second bin $b_1$ for the horizontal component and the second bin $b_1$ for the vertical component may share the same contexts.

If the absolute value of the horizontal component is not greater than the threshold (i.e., if bin $b_1$==0), the remaining bins may be coded using fixed length codes with a length based on the order of the set of codes. If the absolute value of the horizontal component is greater than the threshold (i.e., if bin $b_1$==1), the remaining bins $b_2$ $b_3$ . . . may represent the value of abs(BVx)–(1<<order)–1 and may be coded using the set of codes in Bypass mode. For instance, where the set of codes is a set of exponential golomb codes with order four, the value of abs(BVx)–(1<<order)–1 may be coded using the set of exponential golomb codes with order four. In some examples, other orders of Exponential Golomb codes may be used, e.g., 1, 2, 3, 5. In some examples, other codes may be used, e.g., Golomb-Rice codes.

In some examples, the last bin may indicate the sign of BVx. In some examples, the last bin may be encoded in Bypass mode without any context.

In some examples, the context for the above prefix/regular bins can be shared across components or across bins or both. That is, the context for $b_i$ for the i-$^{th}$ bin may share a context for horizontal and vertical components, i.e., have the same context for horizontal and vertical components, or may have different contexts for horizontal and vertical components. In some examples, the context may be shared across bins, e.g., such that $b_0$, $b_1$ may share the same context. In some examples, the contexts may be shared between the bins for BVD coding and MVD coding in HEVC.

Tables (1)-(3), below, are syntax tables that indicate example changes to the BVD technique described in JCTVC-P1005 to implement one or more techniques of this disclosure. Relative to JCTVC-P1005, additions are marked in italics and deletions are marked by ~~strikethrough~~.

TABLE (1)

| Coding unit syntax | |
|---|---|
| coding_unit( x0, y0, log2CbSize ) { | Descriptor |
|   if( transquant_bypass_enabled_flag ) | |
|     cu_transquant_bypass_flag | ae(v) |
|     .... | |
|     .... | |
|   if( CuPredMode[ x0 ][ y0 ] = = | |
|   MODE_INTRA && ! | |
| *intra_bc_flag[ x0 ][ y0 ]* ) { | |
|     if( PartMode = = PART_2N×2N && | |
|     pcm_enabled_flag && | |
|     ~~!intra_bc_flag[x0][y0] &&~~ | |
|     log2CbSize >= Log2MinIpcmCbSizeY && | |
|     log2CbSize <= Log2MaxIpcmCbSizeY ) | |
|     pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( x0, y0, log2CbSize ) | |
|   ~~} else if(intra_bc_flag[x0][y0]) {~~ | |
|     ~~mvd_coding(x0, y0, 2)~~ | |
|     ~~if(PartMode = = PART_2N×N) {~~ | |
|       ~~mvd_coding(x0, y0 + )nCbS/2), 2)~~ | |
|     ~~else if(PartMode = = PART_N×2N) {~~ | |
|       ~~mvd_coding(x0 + (nCbS/2), y0, 2)~~ | |
|     ~~else if(PartMode = = PART_N×N) {~~ | |
|       ~~mvd_coding(x0 + (nCbS/2), y0, 2)~~ | |

TABLE (1)-continued

| Coding unit syntax | |
|---|---|
| coding_unit( x0, y0, log2CbSize ) { | Descriptor |
|       ~~mvd_coding(x0, y0 + (nCbS/2), 2)~~ | |
|     ~~mvd_coding(x0 + (nCbS/2), y0 + (nCbS/2),2)~~ | |
|   ~~}~~ | |
|   } else { | |
|     pbOffset = ( PartMode = = | |
|   PART_N×N ) ? ( nCbS / 2 ) : nCbS | |
|     .... | |
|     .... | |
|     .... | |
|   } | |

TABLE (2)

| Prediction unit syntax | |
|---|---|
| prediction_unit( x0, y0, nPbW, nPbH ) { | Descriptor |
|   if( cu_skip_flag[ x0 ][ y0 ] ) { | |
|     if( MaxNumMergeCand > 1 ) | |
|       merge_idx[ x0 ][ y0 ] | ae(v) |
|   } *else if (intra_bc_flag[ x0 ][ y0 ]){ /\* Intra BC\*/* | |
|     *intra_bc_bvd_coding( x0, y0, 2)* | |
|   } else { /\* MODE_INTER \*/ | |
|     .... | ae(v) |
|     .... | |
| } | |

TABLE (3)

| IntraBC Block vector difference syntax | |
|---|---|
| *intra_bc_bvd_coding ( x0, y0, refList ) {* | Descriptor |
|   *intra_bc_abs_bvd_greater0_flag[ 0 ]* | *ae(v)* |
|   *intra_bc_abs_bvd_greater0_flag[ 1 ]* | *ae(v)* |
|   *if(intra_bc_abs_bvd_greater0_flag[ 0 ] )* | |
|     *intra_bc_abs_bvd_greater16_flag[ 0 ]* | *ae(v)* |
|   *if(intra_bc_abs_bvd_greater0_flag[ 1 ] )* | |
|     *intra_bc_abs_bvd_greater16_flag[ 1 ]* | *ae(v)* |
|   *if(intra_bc_abs_bvd_greater0_flag[ 0 ] ) {* | |
|     *if(intra_bc_abs_bvd_greater16_flag[ 0 ] )* | |
|       *intra_bc_abs_bvd_minus1[ 0 ]* | *ae(v)* |
|     *intra_bc_bvd_sign_flag[ 0 ]* | *ae(v)* |
|   *}* | |
|   *if(intra_bc_abs_bvd_greater0_flag[ 1 ] ) {* | |
|     *if(intra_bc_abs_bvd_greater1_flag[ 1 ] )* | |
|       *intra_bc_abs_bvd_minus1[ 1 ]* | *ae(v)* |
|     *intra_bc_bvd_sign_flag[ 1 ]* | *ae(v)* |
|   *}* | |
| *}* | |

The following semantics describe example definitions for some of the syntax elements listed in the above syntax tables.

intra_bc_abs_bvd_greater0_flag[compIdx] may specify whether the absolute value of a block vector component difference is greater than 0.

intra_bc_abs_bvd_greater16_flag[compIdx] may specify whether the absolute value of a block vector component difference is greater than 16. When intra_bc_abs_bvd_greater16_flag [compIdx] is not present, it may be inferred to be equal to 0.

intra_bc_abs_bvd_minus1[compIdx] plus 1 may specify the absolute value of a block vector component difference. When intra_bc_abs_bvd_minus1 [compIdx] is not present, it may be inferred to be equal to −1. BV−1<<EGorder−1 intra_bc_bvd_sign_flag[compIdx] may specify the sign of a block vector component difference as follows. If intra_b- c_bvd_sign_flag[compIdx] is equal to 0, the corresponding block vector component difference may have a positive value. Otherwise (intra_bc_bvd_sign_flag[compIdx] is equal to 1), the corresponding block vector component difference may have a negative value. When intra_bc_bvd_sign_flag[compIdx] is not present, it may be inferred to be equal to 0.

The block vector difference BvdIntra [compIdx] for compIdx=0 . . . 1 may be in accordance with Equation (2), below.

BvdIntra[compIdx]=intra_bc_abs_bvd_greater0_flag [compIdx]*(intra_bc_abs_bvd_minus1[compIdx]+1)*(1−2*intra_bc_bvd_sign_flag[compIdx])    Equation (2)

The descriptors in Tables (1)-(3) may be defined as follows:

ae(v): context-adaptive arithmetic entropy-coded syntax element.

f(n): fixed-pattern bit string using n bits written (from left to right) with the left bit first.

TABLE (4)

Syntax elements and associated binarizations

| Syntax structure | Syntax element | Binarization Process | Input parameters |
|---|---|---|---|
| intra_bc_bvd_coding ( ) | intra_bc_abs_bvd_greater0_flag[ ] | FL | cMax = 1 |
|  | intra_bc_abs_bvd_greater16_flag[ ] | FL | cMax = 1 |
|  | intra_bc_abs_bvd_minus1 [ ] | EG4 | — |
|  | intra_bc_bvd_sign_flag [ ] | FL | cMax = 1 |

Figure 5:
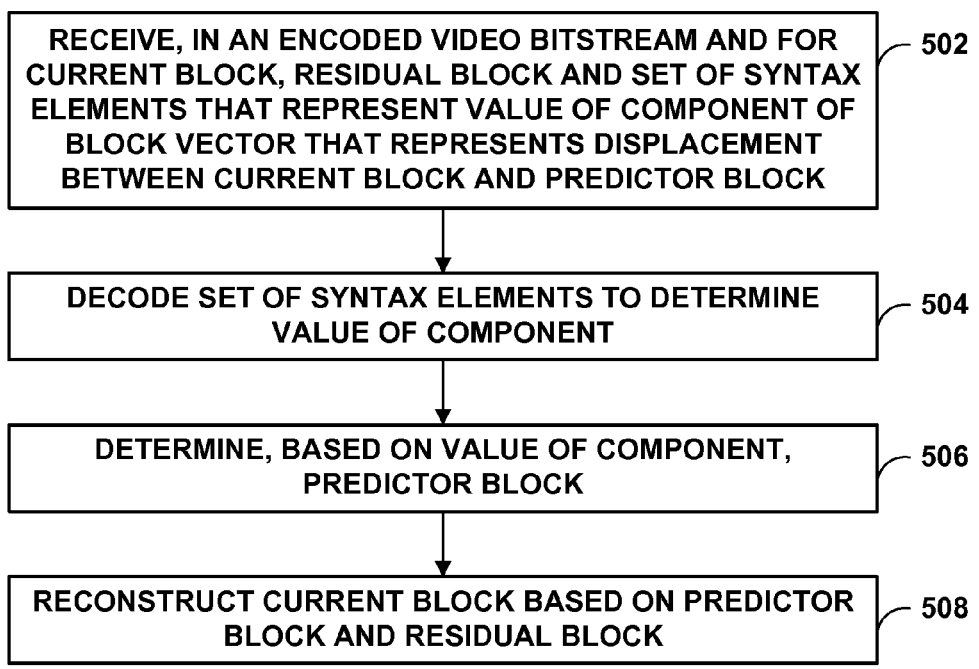
FIG. 5 is a flow diagram illustrating example operations of a video decoder to decode a block vector that identifies a predictor block for a current block, in accordance with one or more techniques of the present disclosure.

FIG. 5 is a flow diagram illustrating example operations of a video decoder to decode a block vector that identifies a predictor block for a current block, in accordance with one or more techniques of the present disclosure. The techniques of FIG. 5 may be performed by one or more video decoders, such as video decoder 30 illustrated in FIGS. 1 and 3. For purposes of illustration, the techniques of FIG. 5 are described within the context of video decoder 30, although video decoders having configurations different than that of video decoder 30 may perform the techniques of FIG. 5.

In accordance with one or more techniques of this disclosure, video decoder 30 may receive, in an encoded video bitstream and for a current block, a residual block that represents pixel differences between a predictor block in a picture in which the current block resides (e.g., predictor block 104 of FIG. 4) and the current block and a set of syntax elements for a component of a block vector (e.g., block vector 106 of FIG. 4) that represents a displacement between a current block (e.g., current block 102 of FIG. 4) and the predictor block (502). As one example, a horizontal component of the block vector (e.g., horizontal component 112 of block vector 106 of FIG. 4) may represent a horizontal displacement between the predictor block and the current block. As another example, a vertical component of the block vector (e.g., vertical component 110 of block vector 106 of FIG. 4) may represent a vertical displacement between the predictor block and the current block.

Video decoder 30 may decode the set of syntax elements to determine a value of a component of the block vector (504). For instance, video decoder 30 may decode the set of syntax elements to determine a value of the component of the block vector in accordance with the technique of FIG. 6.

In some examples, the value of the component of the block vector represented by the syntax elements may be the actual value of the component. For instance, in the above example where the value of a component of a block vector is negative seven, the actual value of that component may be negative seven. In some examples, the value of the component of the block vector represented by the syntax elements may be a differential value of the component that corresponds to a difference between a predictor of the component (e.g., a previous value of the component) and the actual value of the component. In some of such examples, video decoder 30 may determine the actual value of the component by adding the differential value of the component to the predictor of the component.

Video decoder 30 may determine, based on the value of the component, the predictor block (506), and reconstruct the current block based on the residual block and the predictor block identified by the block vector (508). In this way, video decoder 30 may decode the current block.

Figure 6:
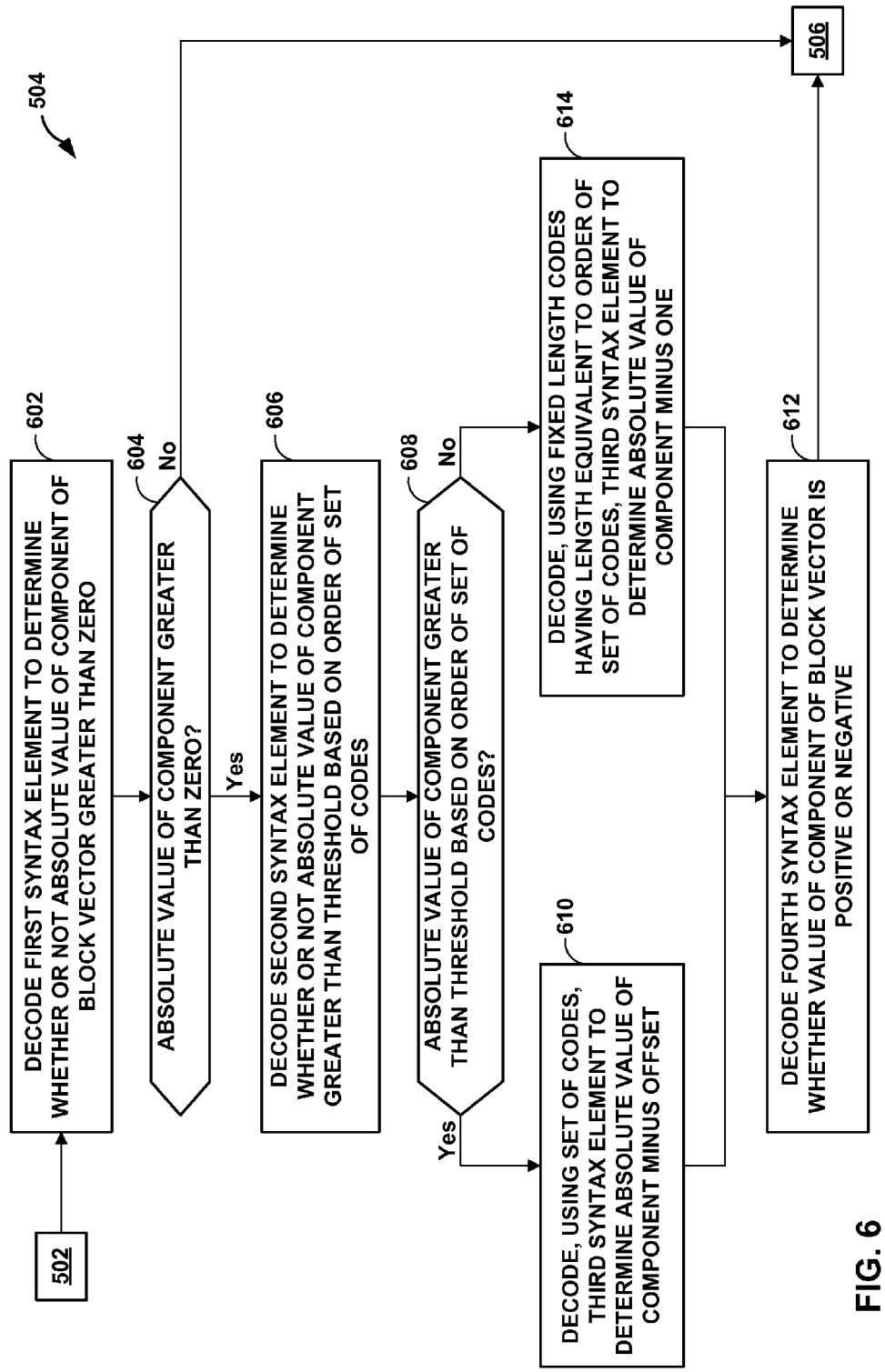
FIG. 6 is a flow diagram illustrating further detail of example operations of a video decoder to decode a block vector that identifies a predictor block for a current block, in accordance with one or more techniques of the present disclosure.

FIG. 6 is a flow diagram illustrating further detail of example operations of a video decoder to decode a block vector that identifies a predictor block for a current block, in accordance with one or more techniques of the present disclosure. The techniques of FIG. 6 may be performed by one or more video decoders, such as video decoder 30 illustrated in FIGS. 1 and 3. For purposes of illustration, the techniques of FIG. 6 are described within the context of video decoder 30, although video decoders having configurations different than that of video decoder 30 may perform the techniques of FIG. 6.

As discussed above, video decoder 30 may decode a set of syntax elements to determine a value of a component of a block vector (504). In accordance with one or more techniques of this disclosure, entropy decoding unit 80 of video decoder 30 may decode a first syntax element of the set of syntax elements to determine whether or not an absolute value of the component of the block vector is greater than zero (602).

If entropy decoding unit 80 determines that the absolute value of the component is not greater than zero ("No" branch of 604), entropy decoding unit 80 may determine that the value of the component is zero and determine, based on the value of the component, the predictor block (506). If entropy decoding unit 80 determines that the absolute value of the component is greater than zero ("Yes" branch of 604), entropy decoding unit 80 may decode a second syntax element of the set of syntax elements to determine whether or not the absolute value of the component is greater than a threshold that is based on an order of a set of codes (606). As discussed above, in some examples, the set of codes may be used to encode a representation of the absolute value of the component. Based on the first and second syntax elements, entropy decoding unit 80 may be able to determine that the absolute value of the component is between 1 and 16.

If entropy decoding unit 80 determines that the absolute value of the component is greater than the threshold ("Yes"

branch of 608), entropy decoding unit 80 may decode, using the set of codes, a third syntax element to determine the absolute value of the component minus an offset (610). If entropy decoding unit 80 determines that the absolute value of the component is not greater than the threshold ("No" branch of 608), entropy decoding unit 80 may decode, using fixed length codes having a length equivalent to the order of the codes, a third syntax element to determine the absolute value of the component minus one (614).

In any case, entropy decoding unit 80 may decode a fourth syntax element to determine whether the value of the component is positive or negative (612). Based on the above determinations, entropy decoding unit 80 may determine the actual value of the component and may output the value to one or more other components of decoder 30, such as prediction processing unit 81, which may determine, based on the value of the component, the predictor block (506). In examples where the block vector has a plurality of components, video decoder 30 may perform the above operations to determine a value of each respective component based on a respective set of syntax elements.

Figure 7:
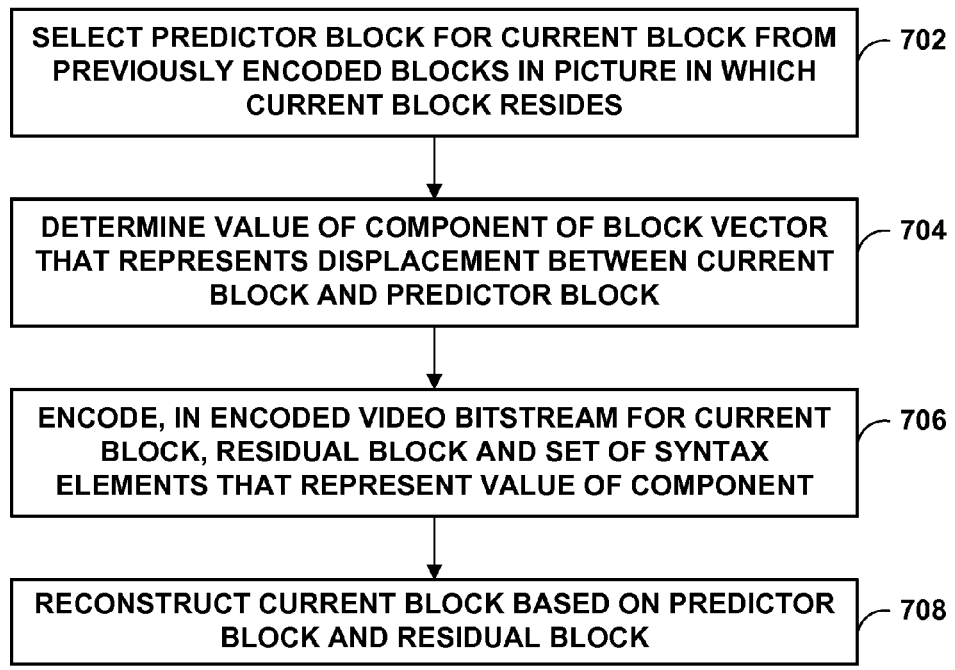
FIG. 7 is a flow diagram illustrating example operations of a video encoder to encode a block vector that identifies a predictor block for a current block, in accordance with one or more techniques of the present disclosure.

FIG. 7 is a flow diagram illustrating example operations of a video encoder to encode a block vector that identifies a predictor block for a current block, in accordance with one or more techniques of the present disclosure. The techniques of FIG. 7 may be performed by one or more video encoders, such as video encoder 20 illustrated in FIGS. 1 and 2. For purposes of illustration, the techniques of FIG. 7 are described within the context of video encoder 20, although video encoders having configurations different than that of video encoder 20 may perform the techniques of FIG. 7.

In accordance with one or more techniques of this disclosure, video encoder 20 may select a predictor block (e.g., predictor block 104 of FIG. 4) for a current block of video data (e.g., current block 102 of FIG. 4) from a plurality of previously encoded block of video data in a picture in which the current block of video data resides (702).

Video encoder 20 may determine a value of a component of a block vector (e.g., block vector 106 of FIG. 4) that represents a displacement between the current block of video data and the predictor block (704). In some examples, the value of the component of the block vector represented by the syntax elements may be the actual value of the component. For instance, in examples where the value of a component of a block vector is negative seven, the actual value of that component may be negative seven. In some examples, the value of the component of the block vector represented by the syntax elements may be a differential value of the component that corresponds to a difference between a predictor of the component (e.g., a previous value of the component) and the actual value of the component. In some of such examples, video encoder 20 may determine the differential value of the component by subtracting the actual value of the component from the predictor of the component.

Video encoder 20 may encode, in an encoded video bitstream, a residual block that represents pixel differences between the predictor block and the current block and a set of syntax elements that represent the value of the component of the block vector (706). For instance, video encoder 20 may encode the set of syntax elements to indicate the value of the component of the block vector in accordance with the technique of FIG. 8.

Video encoder 20 may reconstruct the current block based on the residual block and the predictor block identified by the block vector (708). In this way, video encoder 20 may encode the current block of video data.

Figure 8:
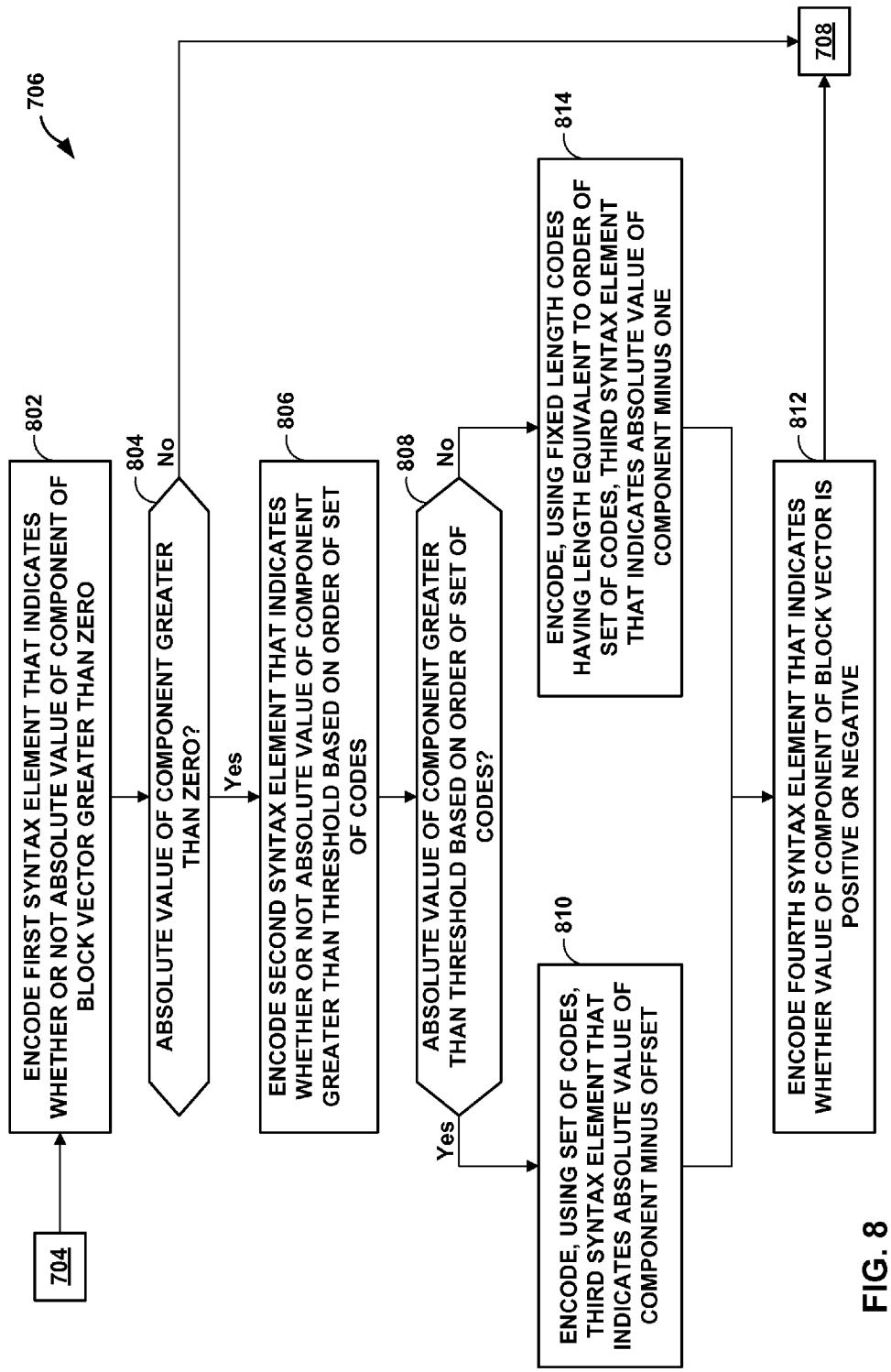
FIG. 8 is a flow diagram illustrating further detail of example operations of a video encoder to encode a block vector that identifies a predictor block for a current block, in accordance with one or more techniques of the present disclosure.

FIG. 8 is a flow diagram illustrating further detail of example operations of a video encoder to encode a block vector that identifies a predictor block for a current block, in accordance with one or more techniques of the present disclosure. The techniques of FIG. 8 may be performed by one or more video encoders, such as video encoder 20 illustrated in FIGS. 1 and 2. For purposes of illustration, the techniques of FIG. 8 are described within the context of video encoder 20, although video encoders having configurations different than that of video encoder 20 may perform the techniques of FIG. 8.

As discussed above, video encoder 20 may encode, in an encoded video bitstream, a set of syntax elements that represent the value of a component of a block vector (706). In accordance with one or more techniques of this disclosure, entropy encoding unit 56 of video encoder 20 may encode a first syntax element of the set of syntax elements that indicates whether or not an absolute value of the component of the block vector is greater than zero (802).

If entropy encoding unit 56 determines that the absolute value of the component is not greater than zero ("No" branch of 804), video encoder 20 may reconstruct the current block based on the predictor block identified by the component and the residual block (708). If entropy encoding unit 56 determines that the absolute value of the component is greater than zero ("Yes" branch of 804), entropy encoding unit 56 may encode a second syntax element of the set of syntax elements to indicate whether or not the absolute value of the component is greater than a threshold that is based on an order of a set of codes (806). As discussed above, in some examples, the set of codes may be used to encode a representation of the absolute value of the component.

If entropy encoding unit 56 determines that the absolute value of the component is greater than the threshold ("Yes" branch of 808), entropy encoding unit 56 may encode, using the set of codes, a third syntax element to indicate the absolute value of the component minus an offset (810). If entropy encoding unit 56 determines that the absolute value of the component is not greater than the threshold ("No" branch of 808), entropy encoding unit 56 may encode, using fixed length codes having a length equivalent to the order of the codes, a third syntax element to indicate the absolute value of the component minus one (814).

In any case, entropy encoding unit 56 may encode a fourth syntax element to indicate whether the value of the component is positive or negative (812), and video encoder 20 may reconstruct the current block based on the predictor block identified by the component and the residual block (708). In examples where the block vector has a plurality of components, video encoder 20 may perform the above operations to encode a respective set of syntax elements to represent the value of each respective component.

The following numbered examples may illustrate one or more aspects of the disclosure:

Example 1

A method for decoding video data, the method comprising: receiving, in an encoded video bitstream and for a current block of video data, a residual block and a set of syntax elements for a component of a block vector that represents a displacement between the current block and a predictor block of video data in a picture in which the current block resides; decoding the set of syntax elements to determine a value of the component of the block vector by at least: decoding a first syntax element of the set of syntax elements to determine whether or not an absolute value of the component of the block vector is greater than zero; based on the absolute value of the component of the block vector being greater than zero, decoding a second syntax element of the set of syntax elements to determine whether or not the absolute value of the component of the block vector is greater than a threshold that is based on an order of a set of codes; based on the absolute value of the component of the block vector being greater than the threshold, decoding, using the set of codes, a third syntax element of the set of syntax elements to determine the absolute value of the component of the block vector minus an offset that is based on the order of the set of codes; and based on the absolute value of the component of the block vector being greater than zero, decoding a fourth syntax element of the set of syntax elements to determine whether the value of the component of the block vector is positive or negative; determining, based on the value of the component of the block vector, the predictor block of video data; and reconstructing the current block of video data based on the predictor block of video data and the residual block.

Example 2

The method of example 1, further comprising: based on the absolute value of the component of the block vector not being greater than the threshold, decoding, using fixed length codes having a length equivalent to the order of the set of codes, the third syntax element to determine the absolute value of the component of the block vector minus one.

Example 3

The method of any combination of examples 1-2, wherein the set of codes comprises a set of exponential golomb codes of the order.

Example 4

The method of any combination of examples 1-3, wherein the order is four.

Example 5

The method of any combination of examples 1-4, wherein a value of the threshold is determined in accordance with the following equation, th=1<<order, where th is the value of the threshold, order is the order, and << is a left-shift operation.

Example 6

The method of any combination of examples 1-5, wherein a value of the offset is the threshold minus one.

Example 7

The method of any combination of examples 1-6, further comprising: determining, based on a fifth syntax element of the set of syntax elements, whether the value of the component is encoded based on a maximum value of the component; based on the value of the component being encoded based on the maximum value of the component: determining the maximum value of the component; determining that the value of the component is encoded using fixed length codes having a length based on the maximum value of the component; and decoding the value of the component using the fixed length codes.

Example 8

The method of any combination of examples 1-7, wherein receiving the plurality of syntax elements that correspond to the component of the block vector comprises: receiving a first set of the syntax elements that correspond to a horizontal component of the block vector, wherein the horizontal component represents a horizontal displacement between the predictor block of video data and the current block of video data; and receiving a second set of the syntax elements that correspond to a vertical component of the block vector, wherein the vertical component represents a vertical displacement between the predictor block of video data and the current block of video data.

Example 9

The method of any combination of examples 1-8, wherein the first syntax element includes a first syntax element for the horizontal component and a first syntax element for the vertical component, the method further comprising decoding the first syntax element for the horizontal component and the first syntax element for the vertical component using context-adaptive binary arithmetic coding (CABAC) with separate contexts for the components.

Example 10

The method of any combination of examples 1-8, wherein the first syntax element includes a first syntax element for the horizontal component and a first syntax element for the vertical component, the method further comprising decoding the first syntax element for the horizontal component and the first syntax element for the vertical component using context-adaptive binary arithmetic coding (CABAC) with the same context for the components.

Example 11

The method of any combination of examples 1-10, wherein the second syntax element includes a second syntax element for the horizontal component and a second syntax element for the vertical component, the method further comprising decoding the second syntax element for the horizontal component and the second syntax element for the vertical component using context-adaptive binary arithmetic coding (CABAC) with separate contexts for the components.

Example 12

The method of any combination of examples 1-10, wherein the second syntax element includes a second syntax element for the horizontal component and a second syntax element for the vertical component, the method further comprising decoding the second syntax element for the horizontal component and the second syntax element for the vertical component using context-adaptive binary arithmetic coding (CABAC) with the same context for the components.

Example 13

The method of any combination of examples 1-12, the method being executable on a wireless communication device, wherein the device comprises: a memory configured to store the video data; a processor configured to execute instructions to process the video data stored in said memory; and a receiver configured to receive the encoded video bitstream.

Example 14

The method of any combination of examples 1-13, wherein the wireless communication device is a cellular telephone and the encoded video bitstream is received by the receiver and demodulated according to a cellular communication standard.

Example 15

A device for decoding video data comprising a memory configured to store the video data; and one or more processors configured to perform the method of any combination of examples 1-12.

Example 16

A device for decoding video data comprising means for performing the method of any combination of examples 1-12.

Example 17

A computer-readable storage medium storing instructions that, when executed, cause one or more processors a device to perform the method of any combination of examples 1-12.

Example 18

A method for encoding video data, the method comprising: selecting a predictor block for a current block of video data from a plurality of previously encoded blocks of video data in a picture in which the current block of video data resides; encoding, in an encoded video bitstream and for the current block of video data, a residual block and a set of syntax elements that represent a value of a component of a block vector that represents a displacement between the current block of video data and the predictor block by at least: encoding a first syntax element of the set of syntax elements that indicates whether or not an absolute value of the component of the block vector is greater than zero; based on the absolute value of the component of the block vector being greater than zero, encoding a second syntax element of the set of syntax elements that indicates whether or not the absolute value of the component of the block vector is greater than a threshold that is based on an order of a set of codes; based on the absolute value of the component of the block vector being greater than the threshold, encoding, using the set of codes, a third syntax element of the set of syntax elements that indicates the absolute value of the component of the block vector minus an offset that is based on the order of the set of codes; and based on the absolute value of the component of the block vector being greater than zero, encoding a fourth syntax element of the set of syntax elements that indicates whether the value of the component of the block vector is positive or negative.

Example 19

The method of example 18, further comprising, based on the absolute value of the component of the block vector not being greater than the threshold: generating the third syntax element of the set of syntax elements to indicate the absolute value of the component of the block vector minus one; and determining to encode the third syntax element using fixed length codes having a length equivalent to the order of the set of codes.

Example 20

The method of any combination of examples 18-19, wherein the set of codes comprises a set of exponential golomb codes of the order.

Example 21

The method of any combination of examples 18-20, wherein the order is four.

Example 22

The method of any combination of examples 18-21, wherein a value of the threshold is determined in accordance with the following equation th=1<<order, where th is the value of the threshold, order is the order, and << is a left-shift operation.

Example 23

The method of any combination of examples 18-22, wherein a value of the offset is the threshold minus one.

Example 24

The method of any combination of examples 18-23, further comprising: determining whether to encode the value of the component based on a maximum value of the component; in response to determining to encode the value of the component based on the maximum value of the component: generating a fifth syntax element of the set of syntax elements that indicates whether the value of the component is encoded based on the maximum value of the component; determining the maximum value of the component; and encoding the value of the component using fixed length codes having a length based on the maximum value of the component.

Example 25

The method of any combination of examples 18-24, wherein encoding the plurality of syntax elements comprises: encoding a first plurality of the syntax elements that correspond to a horizontal component of the block vector, wherein the horizontal component represents a horizontal displacement between the predictor block of video data and the current block of video data; and encoding a second plurality of the syntax elements that correspond to a vertical component of the block vector, wherein the vertical component represents a vertical displacement between the predictor block of video data and the current block of video data.

Example 26

The method of any combination of examples 18-25, wherein the first syntax element includes a first syntax element for the horizontal component and a first syntax element for the vertical component, the method further comprising encoding the first syntax element for the horizontal component and the first syntax element for the vertical component using context-adaptive binary arithmetic coding (CABAC) with separate contexts for the components.

Example 27

The method of any combination of examples 18-26, wherein the first syntax element includes a first syntax element for the horizontal component and a first syntax element for the vertical component, the method further comprising encoding the first syntax element for the horizontal component and the first syntax element for the vertical component using context-adaptive binary arithmetic coding (CABAC) with the same context for the components.

Example 28

A device for encoding video data comprising a memory configured to store the video data; and one or more processors configured to perform the method of any combination of examples 18-27.

Example 29

A device for encoding video data comprising means for performing the method of any combination of examples 18-27.

Example 30

A computer-readable storage medium storing instructions that, when executed, cause one or more processors a device to perform the method of any combination of examples 18-27.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   receiving, in an encoded video bitstream and for a current block of video data, a residual block and a set of syntax elements for a component of a block vector that represents a displacement between the current block and a predictor block of video data in a picture in which the current block resides;
   decoding the set of syntax elements to determine a value of the component of the block vector by at least:
      decoding a first syntax element of the set of syntax elements to determine whether or not an absolute value of the component of the block vector is greater than zero;
      based on the absolute value of the component of the block vector being greater than zero, decoding a second syntax element of the set of syntax elements to determine whether or not the absolute value of the component of the block vector is greater than a threshold that is based on an order of a set of exponential golomb codes, wherein the order is two, three, four, or five;
      based on the absolute value of the component of the block vector being greater than the threshold, decoding, using the set of exponential golomb codes, a third syntax element of the set of syntax elements to determine the absolute value of the component of the block vector minus an offset that is based on the order of the set of codes;

based on the absolute value of the component of the block vector not being greater than the threshold, decoding, using fixed length codes having a length equivalent to the order of the set of exponential golomb codes, the third syntax element to determine the absolute value of the component of the block vector minus one; and based on the absolute value of the component of the block vector being greater than zero, decoding a fourth syntax element of the set of syntax elements to determine whether the value of the component of the block vector is positive or negative;

determining, based on the value of the component of the block vector, the predictor block of video data; and reconstructing the current block of video data based on the predictor block of video data and the residual block.

2. The method of claim 1, wherein the order is four.

3. The method of claim 1, wherein a value of the threshold is determined in accordance with the following equation, $$th = 1 << order$$

where th is the value of the threshold, order is the order, and << is a left-shift operation.

4. The method of claim 1, wherein a value of the offset is the threshold minus one.

5. The method of claim 1, further comprising:
determining, based on a fifth syntax element of the set of syntax elements, whether the value of the component is encoded based on a maximum value of the component;
based on the value of the component being encoded based on the maximum value of the component:
determining the maximum value of the component;
determining that the value of the component is encoded using fixed length codes having a length based on the maximum value of the component; and
decoding the value of the component using the fixed length codes.

6. The method of claim 1, wherein receiving the plurality of syntax elements that correspond to the component of the block vector comprises:
receiving a first set of the syntax elements that correspond to a horizontal component of the block vector, wherein the horizontal component represents a horizontal displacement between the predictor block of video data and the current block of video data; and
receiving a second set of the syntax elements that correspond to a vertical component of the block vector, wherein the vertical component represents a vertical displacement between the predictor block of video data and the current block of video data.

7. The method of claim 6, wherein the first syntax element includes a first syntax element for the horizontal component and a first syntax element for the vertical component, the method further comprising decoding the first syntax element for the horizontal component and the first syntax element for the vertical component using context-adaptive binary arithmetic coding (CABAC) with separate contexts for the components.

8. The method of claim 6, wherein the first syntax element includes a first syntax element for the horizontal component and a first syntax element for the vertical component, the method further comprising decoding the first syntax element for the horizontal component and the first syntax element for the vertical component using context-adaptive binary arithmetic coding (CABAC) with the same context for the components.

9. The method of claim 6, wherein the second syntax element includes a second syntax element for the horizontal component and a second syntax element for the vertical component, the method further comprising decoding the second syntax element for the horizontal component and the second syntax element for the vertical component using context-adaptive binary arithmetic coding (CABAC) with separate contexts for the components.

10. The method of claim 6, wherein the second syntax element includes a second syntax element for the horizontal component and a second syntax element for the vertical component, the method further comprising decoding the second syntax element for the horizontal component and the second syntax element for the vertical component using context-adaptive binary arithmetic coding (CABAC) with the same context for the components.

11. The method of claim 1, the method being executable on a wireless communication device, wherein the device comprises:
a memory configured to store the video data;
a processor configured to execute instructions to process the video data stored in said memory; and
a receiver configured to receive the encoded video bitstream.

12. The method of claim 11, wherein the wireless communication device is a cellular telephone and the encoded video bitstream is received by the receiver and demodulated according to a cellular communication standard.

13. A method for encoding video data, the method comprising:
selecting a predictor block for a current block of video data from a plurality of previously encoded blocks of video data in a picture in which the current block of video data resides;
encoding, in an encoded video bitstream and for the current block of video data, a residual block and a set of syntax elements that represent a value of a component of a block vector that represents a displacement between the current block of video data and the predictor block by at least:
encoding a first syntax element of the set of syntax elements that indicates whether or not an absolute value of the component of the block vector is greater than zero;
based on the absolute value of the component of the block vector being greater than zero, encoding a second syntax element of the set of syntax elements that indicates whether or not the absolute value of the component of the block vector is greater than a threshold that is based on an order of a set of exponential golomb codes, wherein the order is two, three, four, or five;
based on the absolute value of the component of the block vector being greater than the threshold, encoding, using the set of exponential golomb codes, a third syntax element of the set of syntax elements that indicates the absolute value of the component of the block vector minus an offset that is based on the order of the set of codes;
based on the absolute value of the component of the block vector not being greater than the threshold, encoding, using fixed length codes having a length equivalent to the order of the set of exponential golomb codes, the third syntax element to indicate the absolute value of the component of the block vector minus one; and based on the absolute value of the component of the block vector being greater than zero, encoding a fourth syntax element of the set of syntax elements that indicates whether the value of the component of the block vector is positive or negative.

14. The method of claim 13, wherein the order is four.

15. The method of claim 13, wherein a value of the threshold is determined in accordance with the following equation, th=1<<order where th is the value of the threshold, order is the order, and << is a left-shift operation.

16. The method of claim 13, wherein a value of the offset is the threshold minus one.

17. The method of claim 13, further comprising:
determining whether to encode the value of the component based on a maximum value of the component;
in response to determining to encode the value of the component based on the maximum value of the component:
generating a fifth syntax element of the set of syntax elements that indicates whether the value of the component is encoded based on the maximum value of the component;
determining the maximum value of the component; and
encoding the value of the component using fixed length codes having a length based on the maximum value of the component.

18. The method of claim 13, wherein encoding the plurality of syntax elements comprises:
encoding a first plurality of the syntax elements that correspond to a horizontal component of the block vector, wherein the horizontal component represents a horizontal displacement between the predictor block of video data and the current block of video data; and
encoding a second plurality of the syntax elements that correspond to a vertical component of the block vector, wherein the vertical component represents a vertical displacement between the predictor block of video data and the current block of video data.

19. The method of claim 18, wherein the first syntax element includes a first syntax element for the horizontal component and a first syntax element for the vertical component, the method further comprising encoding the first syntax element for the horizontal component and the first syntax element for the vertical component using context-adaptive binary arithmetic coding (CABAC) with separate contexts for the components.

20. The method of claim 18, wherein the first syntax element includes a first syntax element for the horizontal component and a first syntax element for the vertical component, the method further comprising encoding the first syntax element for the horizontal component and the first syntax element for the vertical component using context-adaptive binary arithmetic coding (CABAC) with the same context for the components.

21. A device for encoding or decoding video data, the device comprising:
a memory configured to store data associated with a current block of video data; and
one or more processors configured to:
determine a block vector for a current block of video data as part of intra block copying, wherein a component of the block vector represents a displacement between the current block of video data and a predictor block of video data in a picture in which the current block resides;
determine a value of the component of the block vector by at least the processors being configured to:
determine a first syntax element that indicates whether or not an absolute value of the component of the block vector is greater than zero;
in response to the absolute value of the component of the block vector being greater than zero, determine a second syntax element that indicates whether or not the absolute value of the component of the block vector is greater than a threshold that is based on an order of a set of exponential golomb codes, wherein the order is two, three, four, or five;
in response to the absolute value of the component of the block vector being greater than the threshold:
determine a third syntax element of the set of syntax elements that indicates the absolute value of the component of the block vector minus an offset that is based on the order of the set of exponential golomb codes; and
determine to encode or decode the third syntax element using the set of exponential golomb codes;
in response to the absolute value of the component of the block vector not being greater than the threshold:
determine the third syntax element to indicate the absolute value of the component of the block vector minus one; and
determine to encode or decode the third syntax element using fixed length codes having a length equivalent to the order of the set of exponential golomb codes; and
in response to the absolute value of the component of the block vector being greater than zero, determine a fourth syntax element that indicates whether the value of the component of the block vector is positive or negative; and
reconstruct the current block of video data based on the predictor block of video data and the residual block.

22. The device of claim 21, wherein, to determine the value of the component of the block vector, the one or more processors are configured to:
encode, in an encoded video bitstream and for the current block of video data, a residual block and the first, second, third, and fourth syntax elements.

23. The device of claim 21, further comprising:
a display configured to render the current block of video data,
wherein, to determine the value of the component of the block vector, the one or more processors are configured to:
receive, in an encoded video bitstream and for the current block of video data, a residual block and the first, second, third, and fourth syntax elements.

24. A non-transitory computer-readable storage medium storing instruction that, when executed, cause one or more processors of a device to encode or decode a current block of video data by at least:
determining a block vector for a current block of video data as part of intra block copying, wherein a component of the block vector represents a displacement between the current block of video data and a predictor block of video data in a picture in which the current block resides;

determining a value of the component of the block vector, wherein the instructions that cause the one or more processors to determine the value of the component of the block vectors comprise instructions that cause the one or more processors of the device to:

determine a first syntax element that indicates whether or not an absolute value of the component of the block vector is greater than zero;

in response to the absolute value of the component of the block vector being greater than zero, determine a second syntax element that indicates whether or not the absolute value of the component of the block vector is greater than a threshold that is based on an order of a set of exponential golomb codes, wherein the order is two, three, four, or five;

in response to the absolute value of the component of the block vector being greater than the threshold:

determine a third syntax element of the set of syntax elements that indicates the absolute value of the component of the block vector minus an offset that is based on the order of the set of exponential golomb codes; and determine to encode or decode the third syntax element using the set of exponential golomb codes;

in response to the absolute value of the component of the block vector not being greater than the threshold:

determine the third syntax element to indicate the absolute value of the component of the block vector minus one; and determine to encode or decode the third syntax element using fixed length codes having a length equivalent to the order of the set of exponential golomb codes; and in response to the absolute value of the component of the block vector being greater than zero, determine a fourth syntax element that indicates whether the value of the component of the block vector is positive or negative; and reconstruct the current block of video data based on the predictor block of video data and the residual block.

* * * * *